(12) United States Patent
Kawamura et al.

(10) Patent No.: US 11,407,391 B2
(45) Date of Patent: Aug. 9, 2022

(54) BRAKING CONTROL DEVICE FOR VEHICLE

(71) Applicant: ADVICS CO., LTD., Kariya (JP)

(72) Inventors: Hikaru Kawamura, Nagoya (JP); Shun Tsukamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 718 days.

(21) Appl. No.: 16/325,344

(22) PCT Filed: Aug. 30, 2017

(86) PCT No.: PCT/JP2017/031089
§ 371 (c)(1),
(2) Date: Feb. 13, 2019

(87) PCT Pub. No.: WO2018/043536
PCT Pub. Date: Mar. 8, 2018

(65) Prior Publication Data
US 2019/0202422 A1    Jul. 4, 2019

(30) Foreign Application Priority Data

Aug. 30, 2016  (JP) .............................. JP2016-167761
Sep. 26, 2016  (JP) .............................. JP2016-186641

(51) Int. Cl.
*B60T 8/1761*     (2006.01)
*B60T 8/40*       (2006.01)
(Continued)

(52) U.S. Cl.
CPC .............. *B60T 8/1761* (2013.01); *B60T 8/17* (2013.01); *B60T 8/172* (2013.01); *B60T 8/40* (2013.01);
(Continued)

(58) Field of Classification Search
CPC . B60T 8/17; B60T 8/172; B60T 8/176; B60T 8/1761; B60T 8/17163;
(Continued)

(56) References Cited

U.S. PATENT DOCUMENTS 10,355,631 B1 *  7/2019  Secrest ................... B60L 50/51
11,001,242 B2 *  5/2021  Yasui ..................... B60T 13/662
(Continued)

FOREIGN PATENT DOCUMENTS

JP    2008184057 A    8/2008
JP    2009247147 A    10/2009
(Continued)

OTHER PUBLICATIONS

International Search Report (PCT/ISA/210) dated Dec. 5, 2017, by the Japanese Patent Office as the International Searching Authority for International Application No. PCT/JP2017/03189.
(Continued)

*Primary Examiner* — Peter D Nolan
*Assistant Examiner* — Michael F Whalen
(74) *Attorney, Agent, or Firm* — Buchanan Ingersoll & Rooney PC

(57) ABSTRACT

The braking control device generates braking force by operating an electric motor to press a friction member against a wheel-fixed rotary member. The braking control device includes: a wheel speed sensor detecting wheel speed; a rotation angle sensor detecting a motor rotation angle; a drive circuit driving the motor; and a controller controlling the drive circuit. The controller sets a current limit circle within d-axis/q-axis current characteristics of the motor based on specifications of the drive circuit, calculates a voltage limit circle within the d-axis/q-axis current characteristics based on the rotation angle, executes slip suppression control for reducing the degree of wheel slip based
(Continued)

on the wheel speed, calculates d-axis and q-axis target current values based on intersection points of the current limit circle and the voltage limit circle when execution of slip suppression control begins, and controls the drive circuit based on the d-axis and q-axis target current values.

9 Claims, 10 Drawing Sheets

(51) Int. Cl.
    *B60T 13/74*     (2006.01)
    *H02M 7/48*     (2007.01)
    *B60T 8/17*     (2006.01)
    *B60T 8/172*     (2006.01)

(52) U.S. Cl.
    CPC ............ *B60T 13/74* (2013.01); *B60T 13/745* (2013.01); *H02M 7/48* (2013.01); *B60T 2201/03* (2013.01)

(58) Field of Classification Search
    CPC ........ B60T 8/1812; B60T 8/40; B60T 8/4013; B60T 8/4068; B60T 8/4081; B60T 13/74; B60T 13/745; B60T 2201/13; H02M 7/48
    See application file for complete search history.

(56) References Cited

U.S. PATENT DOCUMENTS

| | | | |
|---|---|---|---|
| 2008/0179941 A1* | 7/2008 | Matsushita | B60T 13/745 303/20 |
| 2011/0025238 A1 | 2/2011 | Ueda et al. | |
| 2018/0294756 A1* | 10/2018 | Yoo | H02P 27/08 |
| 2019/0260319 A1* | 8/2019 | Gagas | B60L 15/20 |
| 2020/0114900 A1* | 4/2020 | Lee | B60K 6/48 |

FOREIGN PATENT DOCUMENTS

| | | | | |
|---|---|---|---|---|
| JP | 2012131293 A | | 7/2012 | |
| JP | 2014051198 A | | 3/2014 | |
| JP | 2014082854 A | * | 5/2014 | ............ H02P 21/10 |
| JP | 2018052145 A | * | 4/2018 | |
| WO | WO-2018043536 A1 | * | 3/2018 | ............ B60T 8/1761 |

OTHER PUBLICATIONS

Written Opinion (PCT/ISA/237) dated Dec. 5, 2017, by the Japanese Patent Office as the International Searching Authority for International Application No. PCT/JP2017/03189.

\* cited by examiner

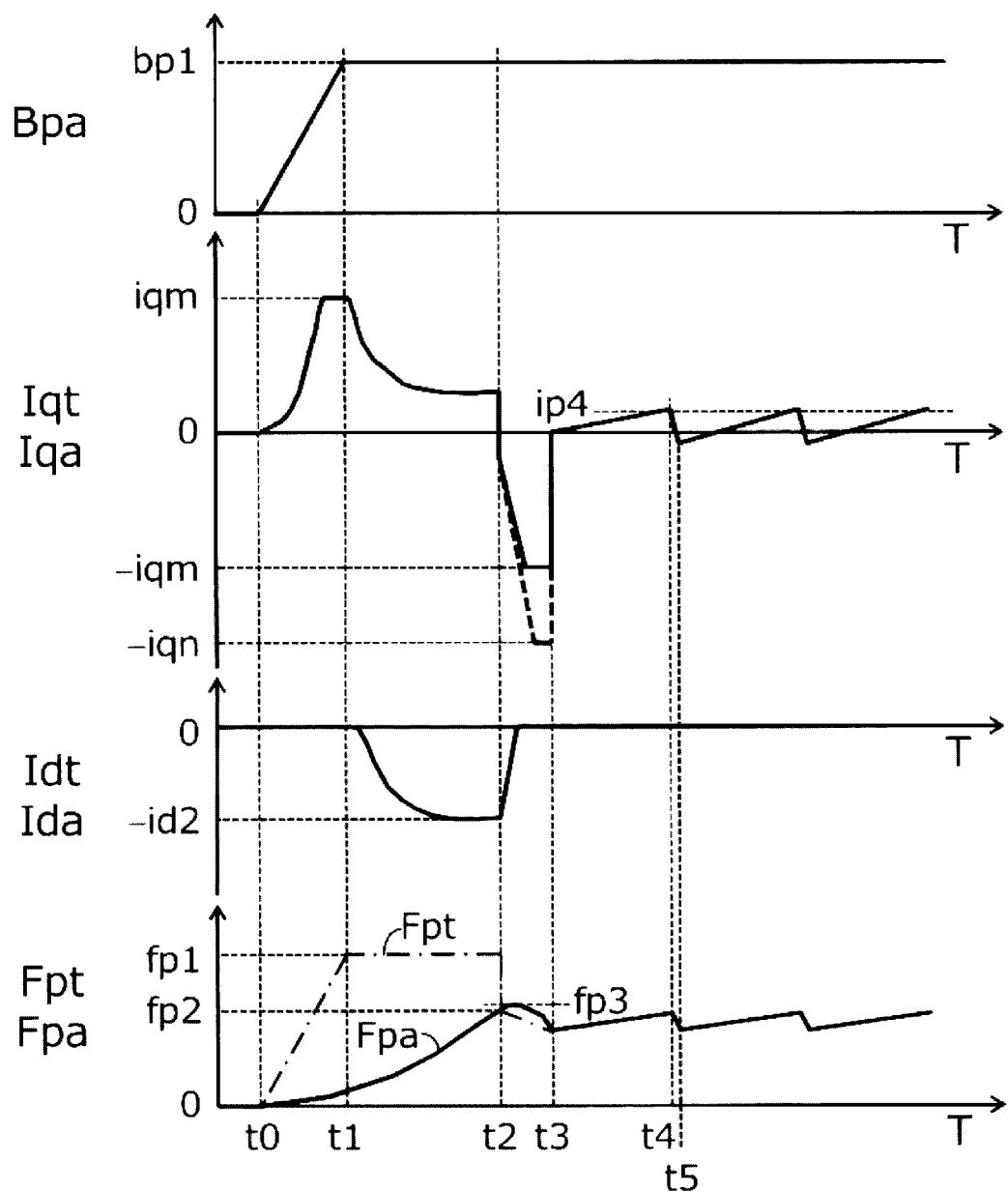

BRAKING CONTROL DEVICE FOR VEHICLE

TECHNICAL FIELD

The present invention relates to a braking control device for a vehicle.

BACKGROUND ART

Patent Document 1 discloses a "configuration in which target brake fluid pressure calculation means M1 calculates a target brake fluid pressure to be generated in a slave cylinder, differentiation means M2 calculates a target brake fluid pressure change rate by differentiating the target brake fluid pressure with respect to time, field current calculation means M3 calculates a field current instruction value of an electric motor driving the slave cylinder on the basis of the target brake fluid pressure change rate, and electric motor control means M4 executes field weakening control on the electric motor on the basis of the field current instruction value. A case in which the target brake fluid pressure change rate is large indicates an emergency case in which a braking force needs to be rapidly increased and the responsiveness of generating the braking force can be improved by promptly operating the slave cylinder and increasing the rotation speed of the electric motor with an increase in the field current instruction value and the weak field amount of the electric motor at this time". for the purpose of "increasing the responsiveness of generating the braking force without increasing the size of the electric motor driving electric braking force generation means".

Patent Document 2 discloses a "configuration in which the driving of a motor driving cylinder 13 applying a brake fluid pressure to a wheel cylinder is controlled by executing field weakening control when a deviation Δθ between an actual motor angle θm and a target motor angle θt obtained in response to a brake operation amount is large. For example, when a motor angle (a rotation amount) is used as an operation amount of an electric actuator, the motor angle can be highly precisely detected by a simple and cheap known rotation sensor or the like, a motor angle change range is widened, and hence braking responsiveness can be easily increased. Further, since there is no influence of a change in load strength, a deviation of the motor angle occurs in a transient state immediately after the start of the field weakening control, and field weakening control can be continuously executed, a change in motor responsiveness characteristic is reduced and hence a stable responsiveness characteristic can be obtained". for the purpose of "further increasing the responsiveness of generating the braking force by the electric actuator with a simple configuration".

The applicant has developed a braking control device for a vehicle which generates a braking torque by an electric motor and suppresses an excessive slip of a vehicle wheel at the time of starting the execution of slip suppression control for the vehicle wheel. Specifically, as described in Patent Document 3, "vehicle wheel slip suppression control" of reducing the braking torque of the vehicle wheel by controlling the electric motor on the basis of the slip state amount of the vehicle wheel is executed. Further, "sudden stop control" of suddenly stopping the rotation of the electric motor on the basis of the slip state amount of the vehicle wheel is executed. The sudden stop control is started in a condition that the vehicle wheel slip suppression control is not executed. As the sudden stop control, "control of stepwisely changing the energization amount of the electric motor by a predetermined energization limit value corresponding to a speed reduction direction of the electric motor" can be executed.

Patent Documents 1 and 2 disclose "field weakening control (also referred to as magnetic flux weakening control)" which is executed by flowing a current from a d axis of the electric motor. In a three-phase brushless motor, a d-axis current and a q-axis current can be independently controlled. For this reason, there is a desire to further suppress an excessive slip of the vehicle wheel at the time of starting the execution of the vehicle wheel slip suppression control by appropriately controlling these currents.

CITATION LIST

Patent Document

Patent Document 1: JP-A-2008-184057
Patent Document 2: JP-A-2012-131293
Patent Document 3: JP-A-2014-051198

SUMMARY OF THE INVENTION

Technical Problem

An object of the invention is to provide a braking control device for a vehicle using a three-phase brushless motor capable of more effectively suppressing an excessive vehicle wheel slip at the time of starting vehicle wheel slip suppression control for suppressing a vehicle wheel slip.

Solution to Problem

A braking control device for a vehicle according to the invention drives an electric motor (MTR) on the basis of a target pressing force (Fpt) corresponding to a request braking force for a vehicle wheel (WH) of a vehicle and generates a braking force in the vehicle wheel (WH) by pressing a friction member (MS) against a rotation member (KT) fixed to the vehicle wheel (WH). The braking control device for the vehicle includes a vehicle wheel speed sensor (VWA) which detects a speed (Vwa) of the vehicle wheel (WH), a rotation angle sensor (MKA) which detects a rotation angle (Mka) of the electric motor (MTR), a driving circuit (DRV) which drives the electric motor (MTR), and a controller (ECU) which controls the driving circuit (DRV) on the basis of the target pressing force (Fpt).

In the braking control device for the vehicle according to the invention, the controller (ECU) sets a current limiting circle (Cis) of dq-axis current characteristics of the electric motor (MTR) on the basis of a specification of the driving circuit (DRV), calculates a voltage limiting circle (Cvs) of the dq-axis current characteristics on the basis of the rotation angle (Mka), calculates a slip state amount (Slp) indicating a slip degree of the vehicle wheel (WH) on the basis of the speed (Vwa) of the vehicle wheel (WH), executes slip suppression control of decreasing the slip degree of the vehicle wheel (WH) on the basis of the slip state amount (Slp), calculates a d-axis target current (Idt) and a q-axis target current (Iqt) on the basis of a correlation between the current limiting circle (Cis) and the voltage limiting circle (Cvs) at the time of starting the execution of the slip suppression control, and controls the driving circuit (DRV) on the basis of the d-axis target current (Idt) and the q-axis target current (Iqt). Specifically, the controller (ECU) calculates an intersection point (Pxb) between the current limiting circle (Cis) and the voltage limiting circle (Cvs) and calculates the d-axis target current (Idt) and the q-axis target current (Iqt) on the basis of the intersection point (Pxb).

In a state in which the electric motor MTR rotates at a high speed in the normal rotation direction, the electric motor MTR tries to continue the rotation by the inertia moment of the rotor of the electric motor MTR in a situation in which vehicle wheel slip suppression control such as anti-skid control starts. In order to suppress the excessive vehicle wheel slip, the rotation speed of the electric motor MTR instantly becomes "0" and hence the electric motor needs to be driven in the reverse rotation direction.

According to the above-described configuration, dq-axis target currents Idt and Iqt are determined on the basis of an intersection point Pxb (corresponding to the current in the reverse rotation direction) between a current limiting circle Cis and a voltage limiting circle Cvs. The intersection point Pxb indicates an operation point in which the output of the electric motor MTR in the reverse rotation direction of the electric motor MTR becomes maximal. For this reason, the electric motor MTR can be most efficiently stopped and reversed. As a result, the responsiveness of the vehicle wheel slip suppression control is improved and the excessive vehicle wheel slip due to the inertia moment of the electric motor MTR can be suppressed.

In the braking control device for the vehicle according to the invention, the controller (ECU) controls the driving circuit (DRV) on the basis of the correlation between the current limiting circle (Cis) and the voltage limiting circle (Cvs) in a non-execution state in which the slip suppression control is not executed and enlarges the current limiting circle (Cis) in the execution start state rather than the current limiting circle (Cis) in the non-execution state.

According to the above-described configuration, the current limiting circle Cis exceeds an allowable current value iqm and is enlarged to an enlarged allowable current value iqn for a short time. For this reason, the electric motor MTR is more efficiently stopped and is reversely rotated after the temperature rise of the electric motor MTR and the driving circuit DRV is suppressed. As a result, the excessive vehicle wheel slip can be suppressed.

The braking control device for the vehicle according to the invention further includes a current sensor (IMA) which detects a current value (Ima) of the driving circuit (DRV), in which the controller (ECU) calculates a d-axis actual current (Ida) corresponding to a d-axis element of the current value (Ima) and a q-axis actual current (Iqa) corresponding to a q-axis element of the current value (Ima) on the basis of the current value (Ima) and the rotation angle (Mka), calculates a counter electromotive force ($\omega \cdot \phi$) of the electric motor (MTR) on the basis of the rotation angle (Mka), calculates a target voltage (Edqs) on the basis of a deviation (eId) between the d-axis target current (Idt) and the d-axis actual current (Ida), a deviation (eIq) between the q-axis target current (Iqt) and the q-axis actual current (Iqa), and the counter electromotive force ($\omega \cdot \phi$) and controls the driving circuit (DRV) on the basis of the target voltage (Edqs).

The driving of the electric motor MTR is achieved by voltage control (that is, voltage control according to current feedback control) based on a deviation eId between the d-axis target current Idt and a d-axis actual current Ida and a deviation eIq between the q-axis target current Iqt and a q-axis actual current Iqa. According to the above-described configuration, an influence of the counter electromotive force (the counter electromotive voltage) generated by the rotation of the electric motor MTR in the voltage control is compensated. For this reason, it is possible to more effectively and rapidly decelerate the electric motor MTR.

BRIEF DESCRIPTION OF THE DRAWINGS

FIG. 10 is a time chart for describing an operation and an effect of the braking control device BCS for the vehicle according to the invention.

MODE FOR CARRYING OUT THE INVENTION

<Entire Configuration of Braking Control Device for Vehicle According to Invention>

Figure 1:
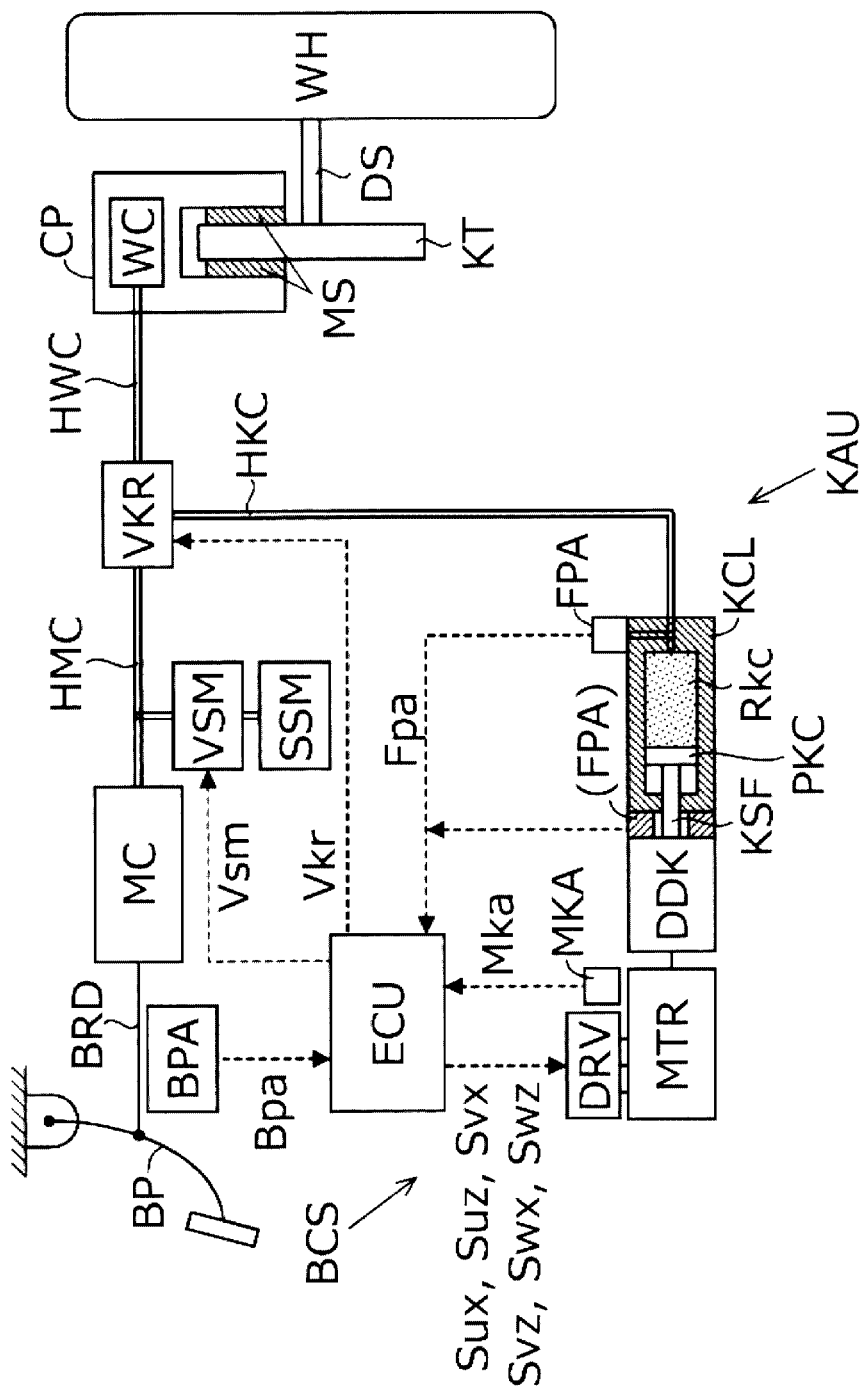
FIG. 1 is an entire configuration diagram of a vehicle equipped with a braking control device BCS for a vehicle according to the invention.

Referring to an entire configuration diagram of FIG. 1, a braking control device BCS according to the invention will be described. In the description below, components, calculation processes, signals, characteristics, and values indicated by the same symbols exhibit the same functions. Thus, a repetitive description will be omitted.

A vehicle including a braking control device BCS is provided with a braking operation member BP, a braking operation amount sensor BPA, a controller ECU, a master cylinder MC, a stroke simulator SSM, a simulator shutoff valve VSM, a pressurization unit KAU, a switching valve VKR, a master cylinder pipe HMC, a wheel cylinder pipe HWC, and a pressurization cylinder pipe HKC. Further, each vehicle wheel WH of the vehicle is provided with a brake caliper CP, a wheel cylinder WC, a rotation member KT, and a friction member MS.

The braking operation member (for example, a brake pedal) BP is a member that is used by a driver to decrease a vehicle speed. When the braking operation member BP is operated, a braking torque for the vehicle wheel WH is adjusted and a braking force is generated in the vehicle wheel WH. Specifically, a rotation member (for example, a brake disk) KT is fixed to the vehicle wheel WH of the vehicle. The brake caliper CP is disposed to sandwich the rotation member KT. Then, the brake caliper (also simply referred to as a caliper) CP is provided with the wheel cylinder WC. When a fluid pressure inside the wheel cylinder WC of the caliper CP is adjusted (increased or decreased), a piston inside the wheel cylinder WC moves (moves forward or backward) with respect to the rotation member KT. By the movement of the piston, the friction member (for example, a brake pad) MS is pressed against the rotation member KT to generate a pressing force. The rotation member KT and the vehicle wheel WH are fixed to rotate together through a fixed shaft DS. For this reason, a braking torque (a braking force) is generated in the vehicle wheel WH due to a friction force generated by the pressing force. Thus, the braking force (the request braking force) required for the vehicle wheel WH is achieved in response to a target value of the pressing force.

The braking operation amount sensor (also simply referred to as an operation amount sensor) BPA is provided in the braking operation member BP. An operation amount Bpa of the braking operation member (the brake pedal) BP by the driver is detected by the operation amount sensor BPA. Specifically, at least one of a fluid pressure sensor for detecting a pressure of the master cylinder MC, an operation displacement sensor for detecting an operation displacement of the braking operation member BP, and an operation force sensor for detecting an operation force of the braking operation member BP is employed as the braking operation amount sensor BPA. In other words, the operation amount sensor BPA is a generic name for the master cylinder fluid pressure sensor, the operation displacement sensor, and the operation force sensor. Thus, the braking operation amount Bpa is determined on the basis of at least one of the fluid pressure of the master cylinder MC, the operation displacement of the braking operation member BP, and the operation force of the braking operation member BP. The operation amount Bpa is input to the controller ECU.

A controller (an electronic control unit) ECU includes an electric circuit board on which a microprocessor or the like is mounted and a control algorithm which is programmed on the microprocessor. The controller ECU controls the pressurization unit KAU (particularly, an electric motor MTR), the shutoff valve VSM, and the switching valve VKR on the basis of the braking operation amount Bpa. Specifically, a signal (Sux or the like) for controlling the electric motor MTR, the shutoff valve VSM, and the switching valve VKR is calculated on the basis of the programmed control algorithm and is output from the controller ECU.

When the braking operation amount Bpa becomes a predetermined value bp0 or more, the controller ECU respectively outputs a driving signal Vsm in which the shutoff valve VSM is set to an open position and a driving signal Vkr in which the switching valve VKR communicates the pressurization cylinder pipe HKC with the wheel cylinder pipe HWC to the electromagnetic valves VSM and VKR. In this case, the master cylinder MC communicates with the simulator SSM and a pressurization cylinder KCL communicates with the wheel cylinder WC.

The controller ECU calculates a driving signal (Sux or the like) for driving the electric motor MTR on the basis of the operation amount Bpa, a rotation angle Mka, and an actual pressing force Fpa (for example, the fluid pressure of the pressurization cylinder KCL) and outputs the driving signal to a driving circuit DRV. Here, the braking operation amount Bpa is detected by the braking operation amount sensor BPA, the actual rotation angle Mka is detected by a rotation angle sensor MKA, and the actual pressing force Fpa is detected by a pressing force sensor FPA. By the pressurization unit KAU driven by the electric motor MTR, the pressure of the braking fluid inside the wheel cylinder WC is controlled (maintained, increased, or decreased).

The master cylinder MC is mechanically connected to the braking operation member BP through a brake rod BRD. By the master cylinder MC, the operation force (the brake pedal stepping force) of the braking operation member BP is changed in accordance with the pressure of the braking fluid. When the master cylinder pipe HMC is connected to the master cylinder MC and the braking operation member BP is operated, the braking fluid is discharged (pressure-fed) from the master cylinder MC to the master cylinder pipe HMC. The master cylinder pipe HMC is a fluid path which connects the master cylinder MC and the switching valve VKR.

The stroke simulator (also simply referred to as the simulator) SSM is provided to generate the operation force in the braking operation member BP. The simulator shutoff valve (also simply referred to as a shutoff valve) VSM is provided between the simulator SSM and a fluid pressure chamber inside the master cylinder MC. The shutoff valve VSM is a two-position electromagnetic valve having an open position and a closed position. The master cylinder MC communicates with the simulator SSM when the shutoff valve VSM is located at the open position and the master cylinder MC is isolated from the simulator SSM (a non-communication state) when the shutoff valve VSM is located at the closed position. The shutoff valve VSM is controlled by the driving signal Vsm from the controller ECU. As the shutoff valve VSM, a normally closed type electromagnetic valve (NC valve) can be employed.

A piston and an elastic member (for example, a compressing spring) are provided inside the simulator SSM. A braking fluid moves from the master cylinder MC to the simulator SSM and the piston is pressed by the flowing braking fluid. A force is applied to the piston by the elastic member in a direction in which the flowing of the braking fluid is prohibited. By the elastic member, the operation force (for example, the brake pedal stepping force) at the time of operating the braking operation member BP is formed.

<<Pressurizing unit KAU>>

The pressurizing unit KAU discharges (pressure-feeds) a braking fluid to the pressurization cylinder pipe HKC by using the electric motor MTR as a power source. Then, the pressurization unit KAU applies a braking torque (a braking force) to the vehicle wheel WH by pressing (pressurizing) the friction member MS against the rotation member KT due to this pressure. In other words, the pressurization unit KAU generates a force (a pressing force) of pressing the friction member MS against the rotation member KT by the electric motor MTR. The pressurization unit KAU includes the electric motor MTR, the driving circuit DRV, a power transmission mechanism DDK, a pressurization shaft KSF, a pressurization cylinder KCL, a pressurization piston PKC, and the pressing force sensor FPA.

The electric motor MTR is a power source for adjusting (increasing or decreasing) the pressure of the braking fluid inside the wheel cylinder WC by the pressurization cylinder KCL. As the electric motor MTR, a three-phase brushless motor is employed. The electric motor MTR includes three coils CLU, CLV, and CLW respectively corresponding to U, V, and W phases and is driven by the driving circuit DRV. The electric motor MTR is provided with the rotation angle sensor MKA which detects the rotor position (the rotation angle) Mka of the electric motor MTR. The rotation angle Mka is input to the controller ECU.

The driving circuit DRV is an electric circuit board on which a switching element (a power semiconductor device) for driving the electric motor MTR is mounted. Specifically, the driving circuit DRV is provided with a three-phase bridge circuit and the energization state to the electric motor MTR is controlled on the basis of the driving signal (Sux or the like). The driving circuit DRV is provided with a current sensor (for example, a current sensor) IMA which detects an actual current Ima (a generic name of respective phases) to the electric motor MTR. The current (the detection value) Ima of each phase is input to the controller ECU.

The power transmission mechanism DDK decelerates the rotational power of the electric motor MTR, converts the rotational power into linear power, and outputs the linear power to the pressurization shaft KSF. Specifically, the power transmission mechanism DDK is provided with a decelerator (not shown) and the rotational power output from the electric motor MTR is decelerated and output to a screw member (not shown). Then, the rotational power is converted into the linear power of the pressurization shaft KSF by the screw member. That is, the power transmission mechanism DDK is a rotation/linear motion conversion mechanism.

The pressurizing piston PKC is fixed to the pressurization shaft KSF. The pressurizing piston PKC is inserted into an inner hole of the pressurization cylinder KCL and a combination of the piston and the cylinder is formed. Specifically, the outer periphery of the pressurization piston PKC is provided with a seal member (not shown) and liquid-tightness with respect to the inner hole (the inner wall) of the pressurization cylinder KCL is secured. That is, the pressurization chamber Rkc filled with the braking fluid is formed by the partitioning of the pressurization cylinder KCL and the pressurization piston PKC.

Inside the pressurization cylinder KCL, the volume of the pressurization chamber Rkc is changed as the pressurization piston PKC moves in the axial direction. With this volume change, the braking fluid moves between the pressurization cylinder KCL and the wheel cylinder WC through braking pipes (fluid paths) HKC and HWC. The fluid pressure inside the wheel cylinder WC is adjusted due to the loading and the unloading of the braking fluid from the pressurization cylinder KCL. As a result, the pressing force of the friction member MS with respect to the rotation member KT is adjusted.

For example, a fluid pressure sensor which detects the fluid pressure Fpa of the pressurization chamber Rkc is provided in the pressurization unit KAU (particularly, the pressurization cylinder KCL) as the pressing force sensor FPA. The fluid pressure sensor (that is, the pressing force sensor) FPA is fixed to the pressurization cylinder KCL to be integrated as the pressurization unit KAU. The pressing force detection value Fpa (that is, the fluid pressure of the pressurization chamber Rkc) is input to the controller ECU. As described above, the pressurization unit KAU has been described.

A "state in which the wheel cylinder WC is connected to the master cylinder MC" and a "state in which the wheel cylinder WC is connected to the pressurization cylinder KCL" are switched by the switching valve VKR. The switching valve VKR is controlled on the basis of the driving signal Vkr output from the controller ECU. Specifically, when the braking operation is not performed (the case of "Bpa<bp0"), the wheel cylinder pipe HWC communicates with the master cylinder pipe HMC through the switching valve VKR and does not communicate with (is isolated from) the pressurization cylinder pipe HKC. Here, the wheel cylinder pipe HWC is a fluid path which is connected to the wheel cylinder WC. When the braking operation is performed (that is, a state of "Bpa bp0"), the switching valve VKR is excited on the basis of the driving signal Vkr, the communication between the wheel cylinder pipe HWC and the master cylinder pipe HMC is interrupted, and the wheel cylinder pipe HWC communicates with the pressurization cylinder pipe HKC.

<Process of Controller ECU>

Figure 2:
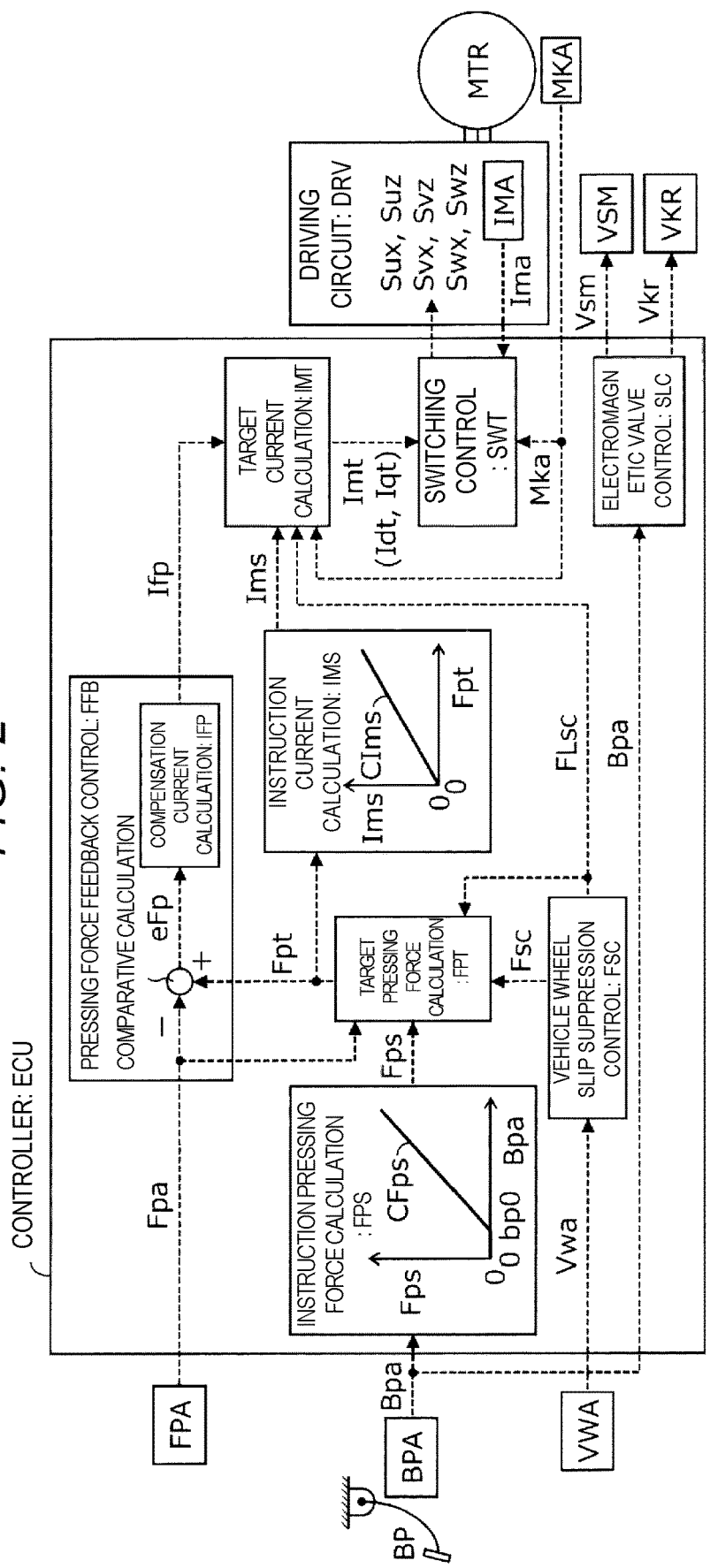
FIG. 2 is a functional block diagram for describing a process of a controller ECU.

Referring to a function block diagram of FIG. 2, a process of the controller (the electronic control unit) ECU will be described. Furthermore, as described above, the components, the calculation processes, the signals, the characteristics, and the values indicated by the same symbols exhibit the same functions.

In the controller ECU, the driving of the electric motor MTR and the excitation of the electromagnetic valves VSM and VKR are performed on the basis of the operation amount Bpa of the braking operation member BP. The electric motor MTR is driven by the driving circuit DRV. The driving circuit DRV (the three-phase bridge circuit) includes switching elements SUX, SUZ, SVX, SVZ, SWX, and SWZ (also simply referred to as "SUX to SWZ"). In the controller ECU, the driving signals Sux, Suz, Svx, Svz, Swx, and Swz (also simply referred to as "Sux to Swz") are calculated and the switching elements SUX to SWZ are controlled on the basis of the driving signal. Further, in the controller ECU, the driving signals Vsm and Vkr are determined and the electromagnetic valves VSM and VKR are controlled on the basis of the driving signal.

The controller ECU includes an instruction pressing force calculation block FPS, a vehicle wheel slip suppression control block FSC, a target pressing force calculation block FPT, an instruction current calculation block IMS, a pressing force feedback control block FFB, a target current calculation block IMT, a switching control block SWT, and an electromagnetic valve control block SLC.

In the instruction pressing force calculation block FPS, an instruction pressing force Fps is calculated on the basis of the braking operation amount Bpa and a calculation characteristic (a calculation map) CFps. Here, the instruction pressing force Fps indicates a target value of the fluid pressure (corresponding to the pressing force) generated by the pressurization unit KAU. Specifically, in the calculation characteristic CFps, the instruction pressing force Fps is calculated to "0 (zero)" in a range in which the braking operation amount Bpa is equal to or larger than "0 (corresponding to a case in which the braking operation is not performed)" and is smaller than a predetermined value bp0 and the instruction pressing force Fps is calculated to monotonously increase from "0" in accordance with an increase in the operation amount Bpa in a range in which the operation amount Bpa is equal to or larger than the predetermined value bp0. Here, the predetermined value bp0 is a value corresponding to an "idle" of the braking operation member BP and is referred to as an "idle value".

In the vehicle wheel slip suppression control block FSC, an adjustment pressing force Fsc is calculated on the basis of a vehicle wheel speed Vwa of each vehicle wheel WH. The adjustment pressing force Fsc is a target value for executing the vehicle wheel slip suppression control. Here, the "vehicle wheel slip suppression control" is used to improve the stability of the vehicle by independently and separately controlling the slip states of four vehicle wheels WH of the vehicle. For example, the vehicle wheel slip suppression control is at least one of anti-skid control (Antilock Brake Control) and braking force distribution control (Electronic Brake Force Distribution Control). In the vehicle wheel slip suppression control block FSC, the adjustment pressing force Fsc for executing at least one of the anti-skid control and the braking force distribution control is calculated.

In the vehicle wheel slip suppression control block FSC, the adjustment pressing force Fsc for the anti-skid control is calculated. Specifically, the adjustment pressing force Fsc for executing the anti-skid control is calculated so that the vehicle wheel lock is prevented on the basis of the acquisition result (the vehicle wheel speed Vwa) of the vehicle wheel speed sensor VWA provided in each vehicle wheel WH. For example, a vehicle wheel slip state amount Slp (a control variable indicating the deceleration slip state of the vehicle wheel) is calculated on the basis of the vehicle wheel speed Vwa. Then, an adjustment pressing force Fsc is determined on the basis of the vehicle wheel slip state amount Slp.

Here, the vehicle wheel slip state amount Slp is a state amount (a variable) indicating the slip degree of the vehicle wheel WH. For example, the vehicle wheel slip state amount Slp is calculated on the basis of at least one of the vehicle wheel slip speed and the vehicle wheel deceleration speed. Here, the vehicle wheel slip speed is calculated on the basis of a difference between the vehicle wheel speed Vwa and a "vehicle body speed Vxa calculated on the basis of the vehicle wheel speed Vwa of each vehicle wheel WH of the vehicle". Further, the vehicle wheel deceleration speed is calculated by differentiating the vehicle wheel speed Vwa with respect to time. Then, the adjustment pressing force Fsc is calculated so that the anti-skid control is started at a time point in which the vehicle wheel slip state amount Slp exceeds a predetermined amount slx and the instruction pressing force Fps decreases. Here, the predetermined amount slx is a determined threshold (constant) for determining whether to execute the anti-skid control.

Similarly, in the vehicle wheel slip suppression control block FSC, the adjustment pressing force Fsc is calculated to execute the braking force distribution control of suppressing the vehicle wheel slip of the rear wheel on the basis of the acquisition result (the vehicle wheel speed Vwa) of the vehicle wheel speed sensor VWA. Specifically, the adjustment pressing force Fsc of the rear wheel is determined on the basis of the slip state amount Slp of the rear wheel with respect to the slip state amount Slp of the front wheel. Specifically, the adjustment pressing force Fsc is calculated so that the braking force distribution control is started at a time point in which a difference between the front wheel slip speed and the rear wheel slip speed exceeds the predetermined speed slz and the instruction pressing force Fps is maintained uniformly. Here, the predetermined speed slz is a determined threshold (constant) for determining whether to execute the braking force distribution control.

In the target pressing force calculation block FPT, a target pressing force Fpt is calculated on the basis of the instruction pressing force Fps and the adjustment pressing force Fsc. Here, the target pressing force Fpt indicates a final target value of the pressing force and corresponds to a request braking force for the vehicle wheel WH. When the vehicle wheel slip suppression control is not executed, the instruction pressing force Fps is directly determined as the target pressing force Fpt. When the vehicle wheel slip suppression control is executed, the instruction pressing force Fps is adjusted by the adjustment pressing force Fsc so that the final target pressing force Fpt is calculated. For example, when the anti-skid control is executed in the vehicle wheel slip suppression control block FSC, the instruction pressing force Fps is adjusted to decrease by the adjustment pressing force Fsc to avoid the vehicle wheel lock. Further, when the braking force distribution control is executed in the vehicle wheel slip suppression control block FSC, the instruction pressing force Fps is adjusted to be maintained by the adjustment pressing force Fsc so that an increase in rear wheel slip is suppressed. Detailed processes of the vehicle wheel slip suppression control block FSC and the target pressing force calculation block FPT will be described below.

In the instruction current calculation block IMS, an instruction current Ims of the electric motor MTR is calculated on the basis of the target pressing force Fpt and a predetermined calculation characteristic (a calculation map) CIms. Here, the instruction current Ims is a target value of a current for controlling the electric motor MTR. In the calculation characteristic CIms, the instruction current Ims is determined so that the instruction current Ims monotonously increases from "0" as the target pressing force Fpt increases from "0".

In the pressing force feedback control block FFB, a compensation current Ifp of the electric motor MTR is calculated on the basis of the target value (for example, the target fluid pressure) Fpt of the pressing force and the actual value (the fluid pressure detection value) Fpa of the pressing force which are control state variables. Since an error is generated in the pressing force only by the control based on the instruction current Ims, a compensation of the error is executed in the pressing force feedback control block FFB. The pressing force feedback control block FFB includes a comparison calculation and a compensation current calculation block IFP.

By the comparison calculation, the target value Fpt (corresponding to the request braking force of the vehicle wheel WH) and the actual value Fpa (corresponding to the braking force generated actually) of the pressing force are compared with each other. Here, the actual value Fpa of the pressing force is a detection value which is detected by the pressing force sensor FPA (for example, the fluid pressure sensor detecting the fluid pressure of the pressurization cylinder KCL). In the comparison calculation, a deviation (a pressing force deviation) eFp between the target pressing force (the target value) Fpt and the actual pressing force (the detection value) Fpa is calculated. The pressing force deviation eFp is input to the compensation current calculation block IFP as a control variable.

The compensation current calculation block IFP includes a proportional element block, a differential element block, and an integral element block. In the proportional element block, the pressing force deviation eFp is multiplied by a proportional gain Kp so that the proportional element of the pressing force deviation eFp is calculated. In the differential element block, the pressing force deviation eFp is differentiated and the result is multiplied by a differential gain Kd so that a differential element of the pressing force deviation eFp is calculated. In the integral element block, the pressing force deviation eFp is integrated and the result is multiplied by an integral gain Ki so that an integral element of the pressing force deviation eFp is calculated. Then, the proportional element, the differential element, and the integral element are added so that a compensation current Ifp is calculated. That is, in the compensation current calculation block IFP, so-called PID control based on the pressing force is executed on the basis of the comparison result (the pressing force deviation eFp) between the target pressing force Fpt and the actual pressing force Fpa so that the actual pressing force (the detection value) Fpa matches the target pressing force (the target value) Fpt (that is, the deviation eFp approaches "0 (zero)").

In the target current calculation block IMT, the instruction current Ims, a target current (a target current vector) Imt which is a final target value of a current is calculated on the basis of the compensation current (the compensation value due to the pressing force feedback control) Ifp and the rotation angle Mka. The target current Imt is a dq-axis vector and includes a d-axis element (also referred to as a "d-axis target current") Idt and a q-axis element (also referred to as a "q-axis target current") Iqt. Furthermore, the target current Imt is also referred to as a target current vector (Idt, Iqt). A detailed process of the target current calculation block IMT will be described later.

In the target current calculation block IMT, the sign (the positive or negative value) of the target current Imt is determined on the basis of the rotation direction of the electric motor MTR (that is, the pressing force increase/decrease direction). Further, the magnitude of the target current Imt is calculated on the basis of the rotational power to be output to the electric motor MTR (that is, the pressing force increase/decrease amount). Specifically, when the pressing force is increased, the sign of the target current Imt is calculated as a positive sign (Imt>0) and the electric motor MTR is driven in a normal rotation direction. Meanwhile, when the pressing force is decreased, the sign of the target current Imt is determined as a negative sign (Imt<0) and the electric motor MTR is driven in a reverse rotation direction. Further, the output torque (the rotational power) of the electric motor MTR is controlled to increase as the absolute value of the target current Imt decreases and the output torque is controlled to decrease as the absolute value of the target current Imt decreases.

In the switching control block SWT, the driving signals Sux to Swz for performing a pulse width modulation on the switching elements SUX to SWZ are calculated on the basis of the target current Imt (Idt, Iqt). On the basis of the target current Imt and the rotation angle Mka, a target value Emt (a generic name of target voltages Eut, Evt, and Ewt of respective phases) of each of the voltages of U, V, and W phases is calculated. A duty ratio Dtt (a generic name of duty ratios Dut, Dvt, and Dwt of respective phases) of a pulse width of each phase is determined on the basis of the target voltage Emt of each phase. Here, the "duty ratio" is a ratio of ON time to one cycle and "100%" corresponds to full energization. Then, the driving signals Sux to Swz for determining whether to set the switching elements SUX to SWZ constituting the three-phase bridge circuit to an ON state (an energization state) or an OFF state (a non-energization state) are calculated on the basis of the duty ratio (the target value) Dtt. The driving signals Sux to Swz are output to the driving circuit DRV.

The energization or non-energization states of six switching elements SUX to SWZ are individually controlled by six driving signals Sux to Swz. Here, since the energization time per unit time of each switching element increases as the duty ratio Dtt (a generic name of respective phases) increases, a larger current flows to the coils CLU, CLV, and CLW. Thus, the rotational power of the electric motor MTR is set to be large.

In the driving circuit DRV, the current sensor IMA (a generic name of current sensors IUA, IVA, and IWA of respective phases) is provided in each phase and the actual current Ima (a generic name of respective phases the actual currents Iua, Iva, and Iwa) is detected. The detection value Ima (a generic name) of each phase is input to the switching control block SWT. Then, so-called current feedback control is executed so that the detection value Ima of each phase matches the target value Imt. Specifically, the duty ratio Dtt (a generic name of the duty ratios Dut, Dvt, and Dwt of respective phases) is individually corrected (finely adjusted) on the basis of a deviation eIm between the actual current Ima and the target current Imt of each phase so that the current deviation eIm approaches By the current feedback control, high-precision motor control can be achieved.

In the electromagnetic valve control block SLC, the driving signals Vsm and Vkr for controlling the electromagnetic valves VSM and VKR are calculated on the basis of the braking operation amount Bpa. When the operation amount Bpa is smaller than the idle value bp0 (particularly, case of "Bpa=0"), the driving signal Vsm is determined so that the simulator shutoff valve VSM is located at the open position in response to the non-braking operation state (for example, when the shutoff valve VSM is an NC valve, the driving signal Vsm instructs non-excitation). At the same time, in the case of "Bpa<bp0", the driving signal Vkr is calculated so that the "master cylinder MC communicates with the wheel cylinder WC and the pressurization cylinder KCL is isolated from the wheel cylinder WC (referred to as a non-excitation state)".

A time point after the braking operation amount Bpa increases so that the operation amount Bpa becomes equal to or larger than the idle value bp0 corresponds to the braking operation state and the driving signal Vsm is determined so that the shutoff valve VSM changes from the closed position to the open position at that time point (the braking operation start time point). When the shutoff valve VSM is the NC valve, an excitation instruction is started as the driving signal Vsm at the braking operation start time point. Further, the driving signal Vkr is determined at the braking operation start time point so that the "master cylinder MC is isolated from the wheel cylinder WC and the pressurization cylinder KCL communicates with the wheel cylinder WC (which is referred to as an excitation state)".

<Processes of Vehicle Wheel Slip Suppression Control Block FSC and Target Pressing Force Calculation Block FPT>

Figure 3:
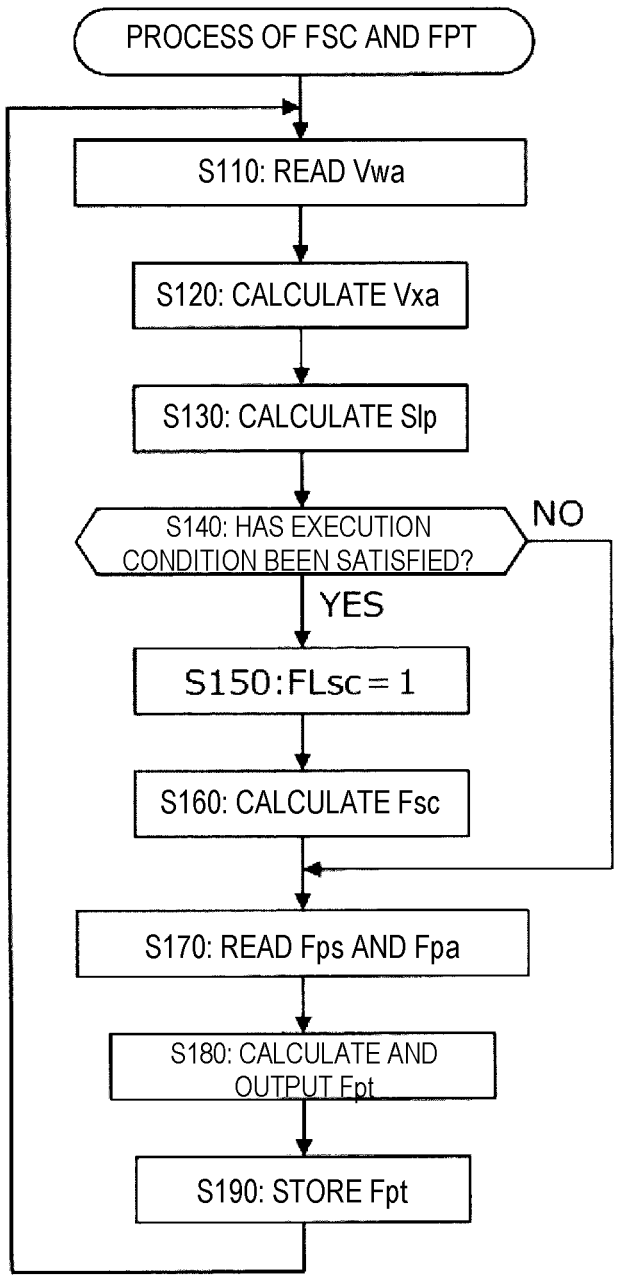
FIG. 3 is a flowchart for describing processes of a vehicle wheel slip suppression control block FSC and a target pressing force calculation block FPT.

Referring to the flowchart of FIG. 3, the processes of the vehicle wheel slip suppression control block FSC and the target pressing force calculation block FPT will be described.

In step S110, the vehicle wheel speed Vwa of each of four vehicle wheels WH of the vehicle is read. The vehicle wheel speed Vwa is detected by the vehicle wheel speed sensor VWA provided in each vehicle wheel WH. In step S120, the vehicle body speed Vxa is calculated on the basis of the vehicle wheel speed Vwa. For example, a maximum value of four vehicle wheel speeds Vwa is employed as the vehicle body speed Vxa.

In step S130, the vehicle wheel slip state amount Slp of each vehicle wheel WH is calculated on the basis of the vehicle wheel speed Vwa. The vehicle wheel slip state amount Slp is a state amount (a variable) indicating the slip degree of the vehicle wheel WH. For example, a slip speed which is a deviation between the vehicle body speed Vxa and the vehicle wheel speed Vwa is employed as the vehicle wheel slip state amount Slp. Further, a vehicle wheel deceleration speed obtained by differentiating the vehicle wheel speed Vwa is employed as the vehicle wheel slip state amount Slp. That is, the vehicle wheel slip state amount Slp is calculated on the basis of at least one of the vehicle wheel slip speed and the vehicle wheel deceleration speed. Here, the vehicle wheel slip ratio is calculated by non-dimensionalizing the vehicle wheel slip speed by the vehicle body speed Vxa and the vehicle wheel slip ratio can be employed as one of the vehicle wheel slip state amount Slp.

In step S140, it is determined whether the "vehicle wheel slip suppression control execution condition is satisfied or not". When the vehicle wheel slip suppression control is the anti-skid control, it is determined whether the "vehicle wheel slip state amount Slp exceeds the predetermined amount slx or not". Here, the predetermined amount slx is a determination threshold value for the anti-skid control and is a predetermined value. Further, when the vehicle wheel slip suppression control is the braking force distribution control, it is determined whether a "difference between the front wheel slip speed and the rear wheel slip speed exceeds the predetermined speed slz or not (or a difference between the front wheel slip ratio and the rear wheel slip ratio exceeds the predetermined value slz or not)". Here, the predetermined speed slz is a determination threshold value for the braking force distribution control and is a predetermined value.

When the vehicle wheel slip suppression control execution condition is satisfied and the determination is positive in step S140 (case of "YES"), the process proceeds to step S150. Meanwhile, when the vehicle wheel slip suppression control execution condition is not satisfied and the determination is negative in step S140 (case of "NO"), the process proceeds to step S170.

In step S150, a control flag FLsc is set to "1". The control flag FLsc is a signal which indicates the execution/non-execution state of the vehicle wheel slip suppression control, is set to "1" in the execution state, and is set to "0" in the non-execution state. Thus, the control flag FLsc is switched from "0" to "1" at the time of starting the vehicle wheel slip suppression control. Further, the control flag FLsc is switched from "1" to "0" at the time of ending the vehicle wheel slip suppression control.

In step S160, the adjustment pressing force Fsc is calculated on the basis of the vehicle wheel slip state amount Slp. The adjustment pressing force Fsc is a target value of the pressing force which is used to calculate the final target pressing force Fpt by adjusting the instruction pressing force Fps. When the vehicle wheel slip suppression control is the anti-skid control, the adjustment pressing force Fsc is determined so that the vehicle wheel slip does not become excessive. Further, when the vehicle wheel slip suppression control is the braking force distribution control, the adjustment pressing force Fsc is determined so that the rear wheel slip enters a predetermined range of the front wheel slip.

In step S170, the instruction pressing force Fps and the actual pressing force Fpa are read. The instruction pressing force Fps is calculated on the basis of the braking operation amount Bpa.

In step S180, the target pressing force Fpt is calculated on the basis of the instruction pressing force Fps, the actual pressing force Fpa, and the adjustment pressing force Fsc. When the vehicle wheel slip suppression control is not executed and the determination of step S140 is negative, "FLsc=0" and "Fsc=0" are satisfied. In this case, in step S180, the instruction pressing force Fps is directly determined as the target pressing force Fpt. Then, the pressing force feedback control is executed on the basis of the target pressing force Fpt (=Fps) and the actual pressing force Fpa.

When the vehicle wheel slip suppression control is executed (when the determination is positive in step S140), the target pressing force Fpt of the current calculation period is calculated on the basis of the target pressing force Fpt of the previous calculation period and the adjustment pressing force Fsc of the current calculation period in step S180. That is, the target pressing force Fpt of the current calculation period is determined by the adjustment of the adjustment pressing force Fsc of the current calculation period with reference to the target pressing force Fpt of the previous calculation period.

Particularly, in step S180, the target pressing force Fpt is determined on the basis of the actual pressing force Fpa and the adjustment pressing force Fsc at a vehicle wheel slip suppression control start time point (that is, a corresponding calculation period). Specifically, in the calculation period in which the control flag FLsc changes from "0" to "1", the actual pressing force Fpa of the current calculation period (that is, the control start time point) is set as a reference and the target pressing force Fpt of the current calculation period is calculated by adding the adjustment pressing force Fsc of the current calculation period thereto. In other words, the target pressing force Fpt is calculated by correcting the instruction pressing force Fps to rapidly decrease to the value of the actual pressing force Fpa at the control execution start time point at the time of starting the execution of the vehicle wheel slip suppression control.

In step S190, the target pressing force (the current value) Fpt of step S180 is stored. The stored target pressing force Fpt is used as a reference for calculating the target pressing force Fpt in the next calculation period. That is, a new target pressing force Fpt (of the current calculation period) is determined by correcting the past target pressing force Fpt (calculated at the previous calculation period) by the adjustment pressing force Fsc after the vehicle wheel slip suppression control start time point.

When the braking operation member BP is rapidly operated, the following of the actual pressing force Fpa with respect to an increase in the instruction pressing force Fps is slow in time. However, at the time point (the calculation period) in which the vehicle wheel slip suppression control starts, the target pressing force Fpt is determined by rapidly decreasing the instruction pressing force Fps to the value of the actual pressing force Fpa at that time point. For this reason, since the interference between the pressing force feedback control and the vehicle wheel slip suppression control is avoided, the actual pressing force Fpa decreases with high responsiveness. As a result, it is possible to suppress the occurrence of the excessive vehicle wheel slip due to the follow-up delay. Further, the actual pressing force Fpa is controlled with reference to the target pressing force (the previous value) Fpt calculated at the previous calculation period even when the instruction pressing force Fps is large during the execution of the vehicle wheel slip suppression control. For this reason, the vehicle wheel slip suppression control can be appropriately continued.

<First Process Example of Target Current Calculation Block IMT>

Figure 4:
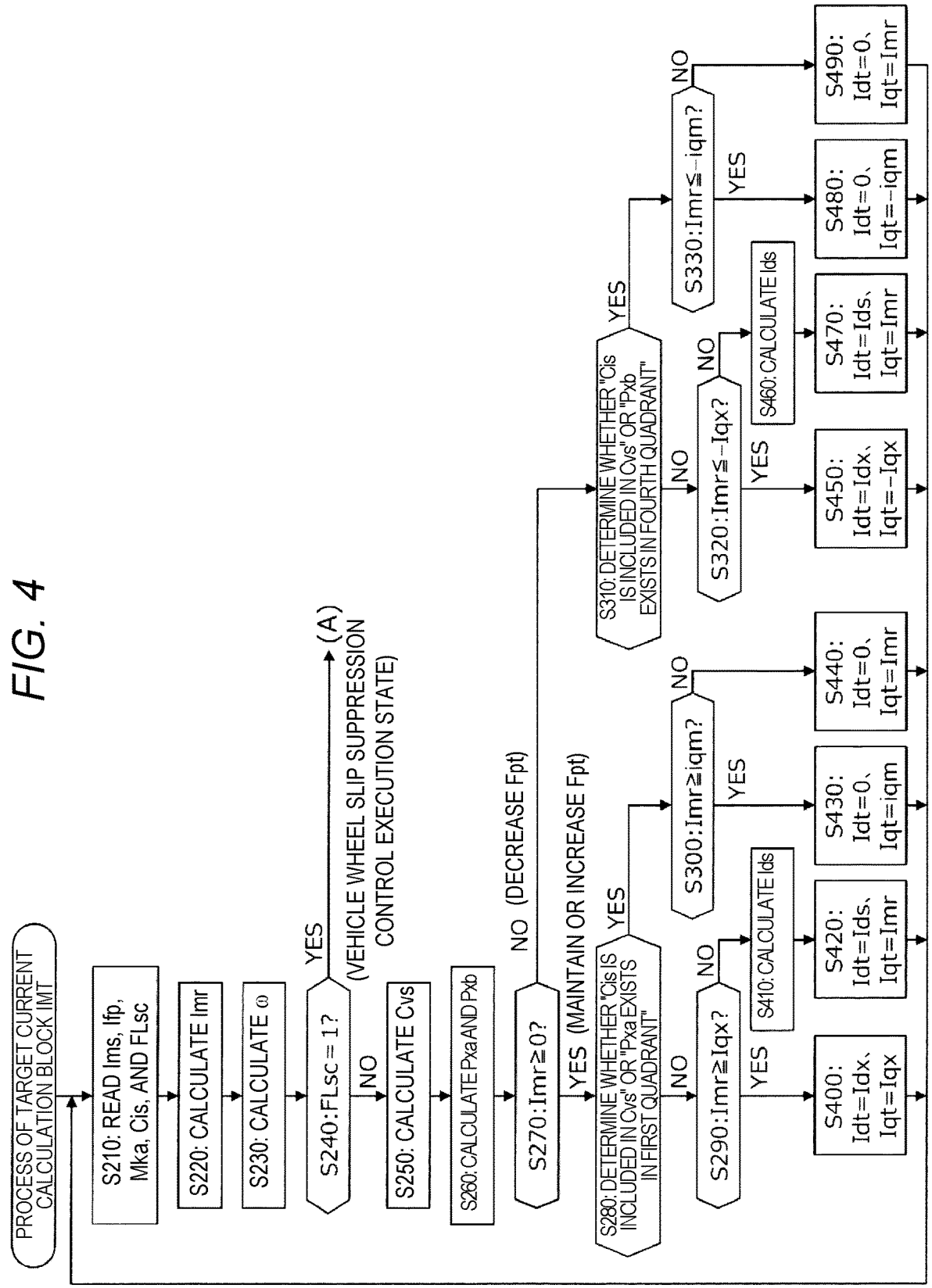
FIG. 4 is a flowchart for describing a first process example of a target current calculation block IMT (particularly, a flow of a process when vehicle wheel slip suppression control is not executed).
Figure 5:
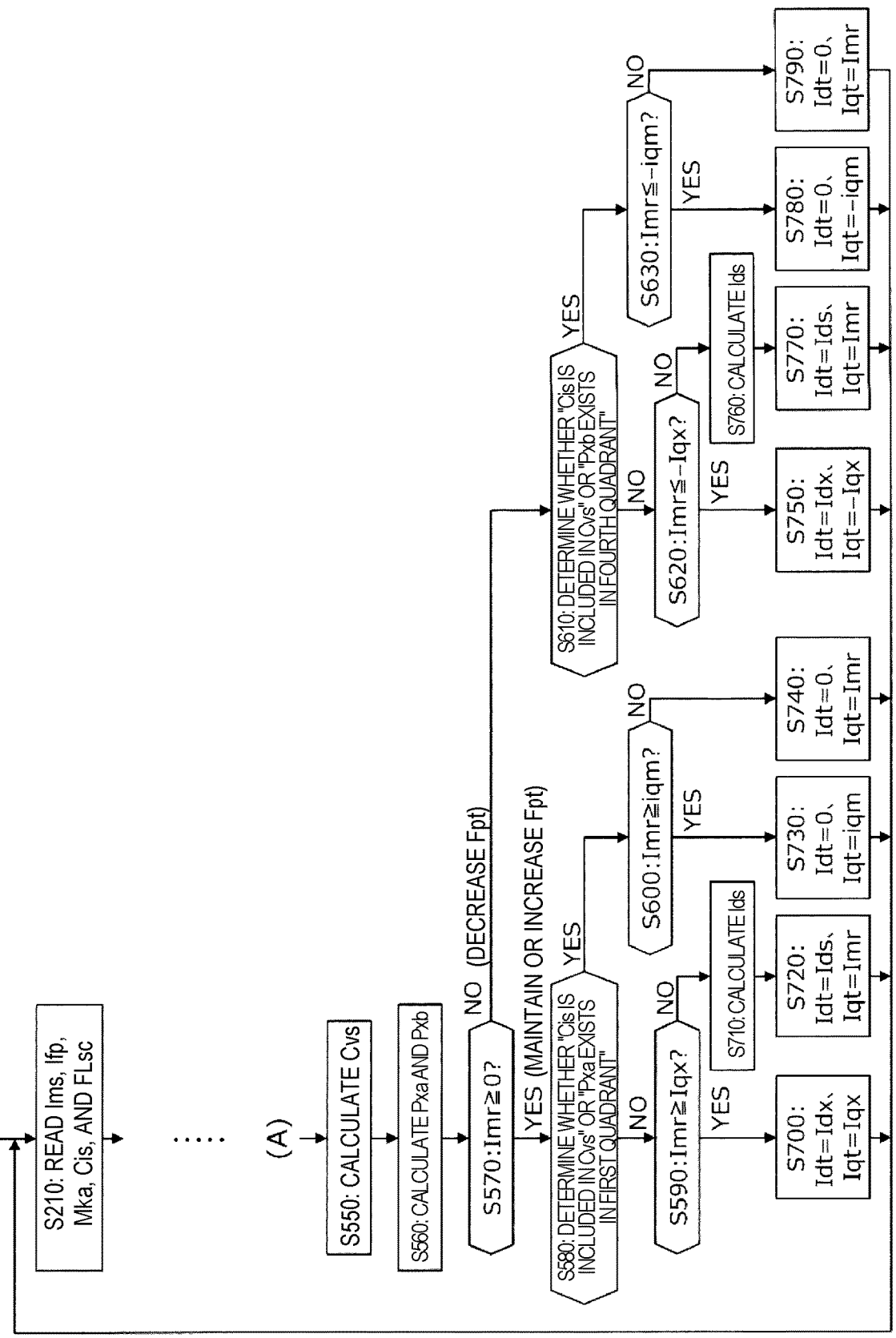
FIG. 5 is a flowchart for describing a first process example of the target current calculation block IMT (particularly, a flow of a process when the vehicle wheel slip suppression control is executed).
Figure 6:
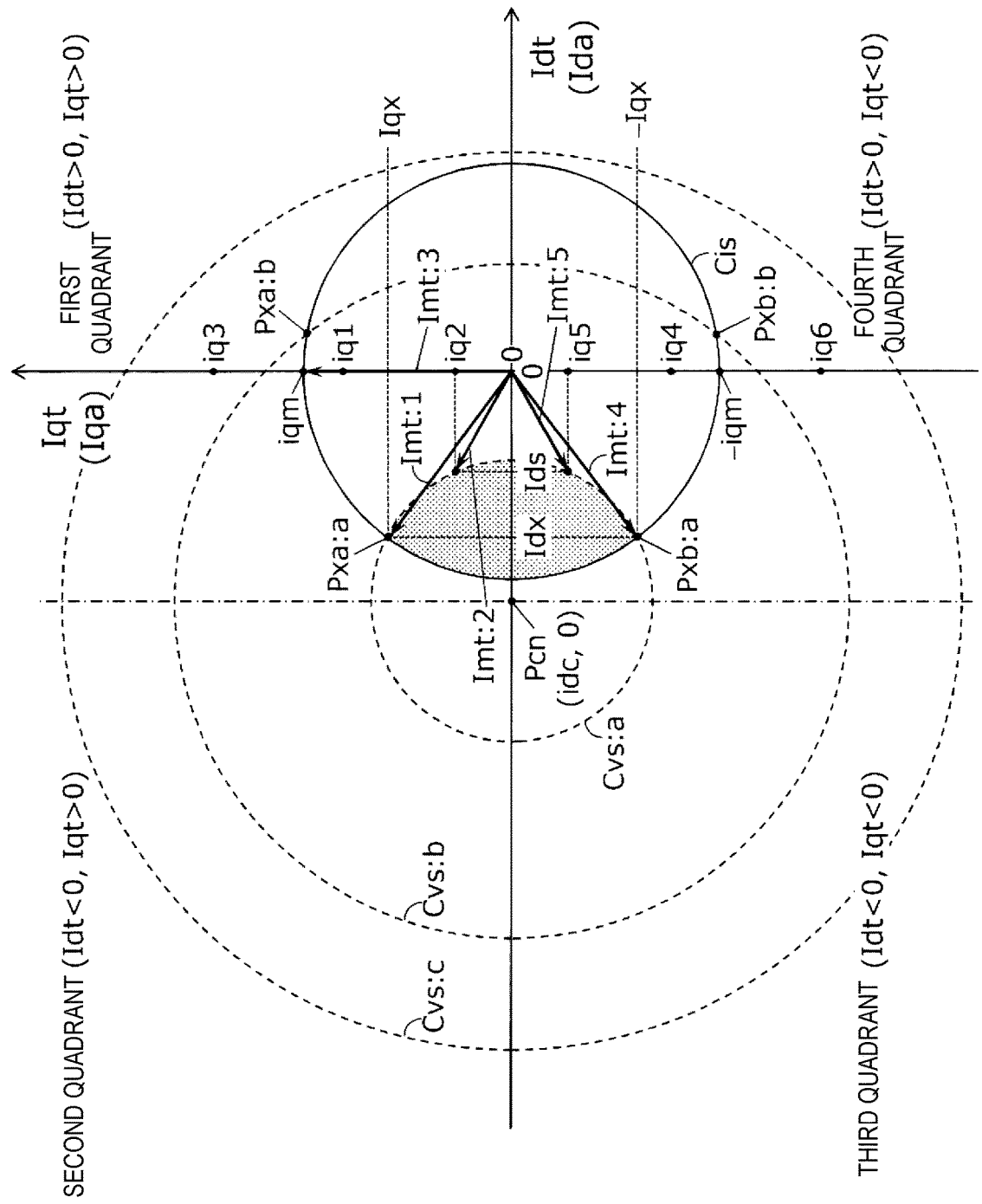
FIG. 6 is a characteristic diagram for describing the first process example of the target current calculation block IMT.

A first process example of the target current calculation block IMT will be described with reference to the flowcharts of FIGS. 4 and 5 and the characteristic diagram of FIG. 6. Here, FIG. 4 corresponds to a process during the non-execution of the vehicle wheel slip suppression control and FIG. 5 corresponds to a process during the execution of the vehicle wheel slip suppression control.

<<Flow of Process During Non-Execution of Vehicle Wheel Slip Suppression Control>>

First, a flow of a process of the target current calculation block IMT during the non-execution of the vehicle wheel slip suppression control will be described with reference to the flowchart of FIG. 4.

In step S210, the instruction current Ims, the compensation current Ifp, the rotation angle Mka, the current limiting circle Cis, and the control flag FLsc are read. Here, the current limiting circle Cis is set in advance on the basis of the allowable current (the maximum current value to be energized) iqm of the switching elements SUX to SWZ (components of the driving circuit DRV) in the current characteristics (dq-axis plane) of the q-axis current and the d-axis current of the electric motor MTR. That is, the current limiting circle Cis is determined from the specification of the driving circuit DRV (particularly, the current rated values iqm of the switching elements SUX to SWZ). Here, the predetermined value iqm is referred to as a "q-axis maximum current value".

In step S220, a compensation instruction current Imr is calculated on the basis of the instruction current Ims and the compensation current Ifp based on the pressing force feedback control. Here, the compensation instruction current Imr is an instruction current compensated on the basis of the pressing force feedback control. Specifically, the compensation instruction current Imr is determined by adding the compensation current Ifp to the instruction current Ims (Imr=Ims+Ifp).

In step S230, an electrical angular velocity $\omega$ of the electric motor MTR is calculated on the basis of the detection value (the rotation angle) Mka of the rotation angle sensor MKA. Specifically, the electrical angular velocity $\omega$ is determined by converting the rotation angle (the mechanical angle) Mka into an electrical angle $\theta$ and differentiating the electrical angle $\theta$ with respect to time. Here, the "mechanical angle Mka" corresponds to the rotation angle of the output shaft of the electric motor MTR. Further, the "electrical angle $\theta$" is an angle in which one cycle of the magnetic field of the electric motor MTR is expressed as $2\pi$ [rad]. Furthermore, the electrical angle $\theta$ can be directly detected by the rotation angle sensor MKA.

In step S240, it is determined whether the "vehicle wheel slip suppression control is executed or not (that is, the control flag FLsc is "1" or "0")". When "FLsc=1" is satisfied and the determination is positive in step S240 (case of "YES"), the process proceeds to step S550 (see (A)). Meanwhile, when "FLsc=0" is satisfied and the determination is negative in step S240 (case of "NO"), the process proceeds to step S250.

In step S250, the voltage limiting circle Cvs is calculated on the basis of the electrical angular velocity $\theta$ of the electric motor MTR. Specifically, the voltage limiting circle Cvs is calculated on the basis of the "predetermined values of a power supply voltage (that is, voltages of a storage battery BAT and a generator ALT) Eba, a phase inductance (that is, inductances of the coils CLU, CLV, and CLW) L, and the number of flux linkage (that is, a magnet strength) $\phi$" in the dq-axis current characteristics (Idt-Iqt plane) of the electric motor MTR and the "electrical angular velocity $\omega$ of the electric motor MTR calculated from the rotation angle Mka". The radius of the voltage limiting circle Cvs decreases as the rotation speed dMk of the electric motor MTR increases and the radius of the voltage limiting circle Cvs increases as the rotation speed dMk decreases.

In step S260, two points Pxa (Idx, Iqx) and Pxb (Idx, −Iqx) in which the current limiting circle Cis intersects the voltage limiting circle Cvs on the dq-axis current plane are calculated on the basis of the current limiting circle Cis and the voltage limiting circle Cvs. Here, the values Idx and Iqx (or −Iqx) are variables indicating the dq-axis coordinates of the intersection points Pxa and Pxb. Further, an intersection point Pxa (Idx, Iqx) corresponds to the normal rotation direction of the electric motor MTR and is referred to as a "first intersection point Pxa". Further, an intersection point Pxb (Idx, −Iqx) corresponds to the reverse rotation direction of the electric motor MTR and is referred to as a "second intersection point Pxb". Two intersection points Pxa and Pxb are also referred to as an "intersection point Px" as a generic name.

An overlapping region between the current limiting circle Cis and the voltage limiting circle Cvs is actually a current range (also referred to as an "energizable region") which can be achieved by the current feedback control. Thus, even when an instruction other than the energizable region is made, the current instruction cannot be actually achieved in the current feedback control. Furthermore, when the rotation speed dMk is small (for example, when the electric motor MTR is stopped), the intersection point Px (a generic name of Pxa and Pxb) does not exist in some cases.

In step S270, it is determined whether the "compensation instruction current Imr is equal to or larger than "0" or not". That is, it is determined whether the "compensation instruction current Imr instructs the normal rotation direction or the reverse rotation direction of the electric motor MTR". When "Imr≥0" and the determination is positive in step S270 (case of "YES"), the process proceeds to step S280. Meanwhile, when "Imr<0" and the determination is negative in step S270 (case of "NO"), the process proceeds to step S310.

In step S280, it is determined whether the "current limiting circle Cis is included in the voltage limiting circle Cvs or not" or the "first intersection point Pxa (Idx, Iqx) exists in the first quadrant of the dq-axis current plane or not. Here, the "first quadrant" is a region in which both the d-axis current and the q-axis current are positive. When the determination is positive in step S280 (case of "YES"), the process proceeds to step S300. Meanwhile, when the determination is negative in step S280 (case of "NO"), the process proceeds to step S290.

In step S290, it is determined whether the "compensation instruction current Imr is equal to or larger than the q-axis coordinate Iqx (the variable) of the first intersection point Pxa or not" on the basis of the compensation instruction current Imr and the coordinate (Idx, Iqx) of the first intersection point Pxa. When the determination is positive in step S290 (case of "YES"), the process proceeds to step S400. Meanwhile, when the determination is negative in step S290 (case of "NO"), the process proceeds to step S410.

In step S300, it is determined whether the "compensation instruction current Imr is equal to or larger than the q-axis intersection point iqm (the q-axis maximum current value) of the current limiting circle Cis or not" on the basis of the compensation instruction current Imr and the current limiting circle Cis. When the determination is positive in step S300 (case of "YES"), the process proceeds to step S430. Meanwhile, when the determination is negative in step S300 (case of "NO"), the process proceeds to step S440.

In step S310, it is determined whether the "current limiting circle Cis is included in the voltage limiting circle Cvs or not" or the "second intersection point Pxb (Idx, −Iqx) exists in the fourth quadrant in the dq-axis current plane or not". Here, the "fourth quadrant" is a region in which the d-axis current is positive and the q-axis current is negative. When the determination is positive in step S310 (case of "YES"), the process proceeds to step S330. Meanwhile, when the determination is negative in step S310 (case of "NO"), the process proceeds to step S320.

In step S320, it is determined whether the "compensation instruction current Imr is smaller than the q-axis coordinate-Iqx (the variable) of the second intersection point Pxb or not" on the basis of the compensation instruction current Imr and the coordinate (Idx, −Iqx) of the second intersection point Pxb. When the determination is positive in step S320 (case of "YES"), the process proceeds to step S450. Meanwhile, when the determination is negative in step S320 (case of "NO"), the process proceeds to step S460.

In step S330, it is determined whether the "compensation instruction current Imr is smaller than the q-axis intersection point-iqm (the q-axis minimum current value) of the current limiting circle Cis or not" on the basis of the compensation instruction current Imr and the current limiting circle Cis. When the determination is positive in step S330 (case of "YES"), the process proceeds to step S480. Meanwhile, when the determination is negative in step S330 (case of "NO"), the process proceeds to step S490.

In step S400, the d-axis target current Idt is determined as an intersection point d-axis coordinate Idx (which is a variable and is also referred to as a "first intersection point d-axis coordinate") and the q-axis target current Iqt is determined as an intersection point q-axis coordinate Iqx (which is a variable and is also referred to as a "first intersection point q-axis coordinate") (that is, "Idt=Idx, Iqt=Iqx"). In step S410, a voltage limiting circle d-axis coordinate Ids (which is a variable and is simply referred to as a "limiting circle d-axis coordinate") is calculated on the basis of the compensation instruction current Imr and the voltage limiting circle Cvs. Specifically, the limiting circle d-axis coordinate Ids is a d-axis coordinate of an intersection point of the voltage limiting circle Cvs and "Iqt=Imr". That is, the coordinate indicates a value (a coordinate) of the d-axis target current Idt when the compensation instruction current Imr is applied to the q-axis target current Iqt in the voltage limiting circle Cvs (see Equation (2) to be described below). Then, in step S420, the d-axis target current Idt is determined to match the voltage limiting circle d-axis coordinate Ids and the q-axis target current Iqt is determined to match the compensation instruction current Imr (that is, "Idt=Ids, Iqt=Imr").

In step S430, the d-axis target current Idt is determined as "0" and the q-axis target current Iqt is determined as the q-axis maximum current value iqm (the predetermined value) (that is, "Idt=0, Iqt=iqm"). In step S440, the d-axis target current Idt is determined to match "0" and the q-axis target current Iqt is determined to match the compensation instruction current Imr (that is, Idt=0, Iqt=Imr).

In step S450, the d-axis target current Idt is determined as an intersection point d-axis coordinate Idx (which is a variable and is also referred to as a "second intersection point d-axis coordinate") and the q-axis target current Iqt is determined as an intersection point q-axis coordinate Iqx (which is a variable and is also referred to as a "second intersection point q-axis coordinate") (that is, "Idt=Idx, Iqt=−Iqx"). In step S460, similarly to step S410, the limiting circle d-axis coordinate Ids (a value of the d-axis target current Idt in the voltage limiting circle Cvs in the case of "Iqt=Imr") is calculated on the basis of the compensation instruction current Imr and the voltage limiting circle Cvs. Then, in step S470, the d-axis target current Idt is determined to match the limiting circle d-axis coordinate Ids and the q-axis target current Iqt is determined to match the compensation instruction current Imr (that is, "Idt=Ids, Iqt=Imr").

In step S480, the d-axis target current Idt is determined as "0" and the q-axis target current Iqt is determined as a q-axis minimum current value −iqm (a predetermined value) (that is, "Idt=0, Iqt=−iqm"). In step S490, the d-axis target current Idt is determined to match "0" and the q-axis target current Iqt is determined to match the compensation instruction current Imr (that is, Idt=0, Iqt=Imr). As described above, a flow of the process during the non-execution of the vehicle wheel slip suppression control has been described.

<<Flow of Process During Execution of Vehicle Wheel Slip Suppression Control>>

Next, a flow of a process of the target current calculation block IMT during the execution of the vehicle wheel slip suppression control will be described with reference to the flowchart of FIG. 5. Since the processes from step S210 to step S240 are common, a description thereof will be omitted.

The processes from step S550 to step S630 are the same as those from step S250 to S330. Further, the processes from step S700 to step S790 are the same as those from step S400 to step S490 at the time of determining the dq-axis target currents Idt and Iqt. Thus, a process during the non-execution of the vehicle wheel slip suppression control described with reference to FIG. 4 can be replaced as a process during the execution of the vehicle wheel slip suppression control described with reference to FIG. 5. Specifically, in the first half of each step symbol, one in which "S2" is replaced with "S5", "S3" is replaced with "S6", and "S4" is replaced with "S7" corresponds to the description of the process during the execution of the vehicle wheel slip suppression control.

<<Target Current Vector Imt (Idt, Iqt) of Correlation of Current Limiting Circle Cis and Voltage Limiting Circle Cvs>>

Next, a process of determining a target current vector Imt (Idt, Iqt) (that is, a process from step S400 to step S490 and a process from step S700 to step S790) will be described with reference to the characteristic diagram of FIG. 6. Furthermore, steps S400 to S440 and steps S700 to S740 correspond to a case in which the electric motor MTR is driven in the normal rotation direction (that is, "Imr≥0"). Further, steps S450 to S490 and steps S750 to S790 correspond to a case in which the electric motor MTR is driven in the reverse rotation direction (that is, "Imr<0").

The current limiting circle Cis is determined on the basis of the maximum rated value (the rated current iqm) of the switching element constituting the driving circuit DRV (particularly, abridge circuit BRG). Here, the maximum rated value is determined as the maximum allowable values of the current flowing in the switching element (power MOS-FET or the like), the applicable voltage, the electric power loss, and the like.

Specifically, the current limiting circle Cis is expressed as a circle centered on an origin O (a point of "Idt=0 and Iqt=0") in the dq-axis current characteristics (Idt-Iqt plane). Further, the radius of the current limiting circle Cis is the allowable current value iqm (the predetermined value) of each of the switching elements SUX to SWZ. That is, the current limiting circle Cis intersects the q axis at the point (0, iqm) and (0, −iqm) and intersects the d axis at the point (−iqm, 0) and (iqm, 0). The current limiting circle Cis in the dq-axis current characteristics is determined by Equation (1).

$$Idt^2 + Iqt^2 = iqm^2 \qquad \text{Equation (1)}$$

Further, the voltage limiting circle Cvs in the dq-axis current characteristics of the electric motor MTR is determined by Equation (2).

$$\{Idt + (\phi/L)\}^2 + Iqt^2 = \{Eba/(L \cdot \omega)\}^2 \qquad \text{Equation (2)}$$

Here, "Eba" indicates the power supply voltage (that is, the voltages of the storage battery BAT and the generator ALT), "L" indicates the phase inductance, and "φ" indicates the number of flux linkage (the magnet strength). Further, "ω" indicates the electrical angular velocity of the electric motor MTR. Furthermore, the electrical angular velocity ω indicates a change amount of the electrical angle θ (an angle in which one cycle of the magnetic field of the electric motor MTR is expressed as 2π [rad]) of the electric motor MTR with time and is calculated from the rotation angle Mka.

The voltage limiting circle Cvs is expressed as a circle in which the coordinate of the center Pcn (idc, 0) is (−(φ/L), 0) and the radius is "Eba/(L·ω)". The power supply voltage Eba is a predetermined value (a constant) and the electrical angular velocity ω increases as the rotation speed dMk increases. For this reason, the radius of the voltage limiting circle Cvs decreases as the rotation speed dMk becomes faster. In contrast, the radius of the voltage limiting circle Cvs increases as the rotation speed dMk becomes slower.

A case in which the rotation speed dMk (that is, the electrical angular velocity ω) of the electric motor MTR is relatively large is indicated by the voltage limiting circle Cvs: a. In this state, in the correlation between the current limiting circle Cis and the voltage limiting circle Cvs: a, the current limiting circle Cis and the voltage limiting circle Cvs: a intersect each other at two points Pxa: a and Pxb: a. In this state, since a first intersection point Pxa: a exists in the second quadrant and a second intersection point Pxb: a exists in the third quadrant, the determination processes are negative in steps S280, S310, S580, and S610.

Furthermore, in two intersection points Pxa and Pxb, the intersection point Pxa (the first intersection point) in which the q-axis target current Iqt is positive corresponds to the normal rotation direction of the electric motor MTR. Further, in two intersection points Pxa and Pxb, the intersection point Pxb (the second intersection point) in which the q-axis target current Iqt is negative corresponds to the reverse rotation direction of the electric motor MTR.

In this state, the determination processes are positive in steps S290 and S590 in the case of "Imr=iq1 (>Iqx)" set so that the electric motor MTR is driven in the normal rotation direction. Then, in steps S400 and S700, "Idt=Idx and Iqt=Iqx" are determined. That is, the target current vector Imt is limited to a first intersection point d-axis coordinate Idx and a first intersection point q-axis element Iqx of respective elements of the dq axes on the basis of the coordinate (Idx, Iqx) of the first intersection point Pxa.

Further, the determination processes are positive in steps S320 and S620 in the case of "Imr=iq4 (<−Iqx)" so that the electric motor MTR is driven in the reverse rotation direction. Then, in steps S450 and S750, "Idt=Idx and Iqt=−Iqx" are determined. That is, the target current vector Imt is limited to a second intersection point d-axis coordinate Idx and a second intersection point q-axis element −Iqx of respective elements of the dq axes on the basis of the coordinate (Idx, −Iqx) of the second intersection point Pxb.

In the energization to the electric motor MTR, the dq-axis current which can actually flow during the current feedback control corresponds to a region (a shaded region and an energizable region) in which the current limiting circle Cis and the voltage limiting circle Cvs overlaps each other. When the control is executed while being deviated from the energizable region, the driving of the electric motor MTR is insufficient and an overload (a load exceeding a rated current) may be applied to the switching element occasionally.

The intersection point Pxa: a and Pxb: a on the boundary of the energizable region indicates a point in which the output (which is a work amount per unit time and is a work rate) becomes maximal. For this reason, when the rotation speed dMk is relatively large and the absolute value of the compensation instruction current Imr is relatively large, a vector Imt: 1 (a vector directed from the origin O to the first intersection point Pxa: a) and a vector Imt: 4 (a vector directed from the origin O to the second intersection point Pxb: a) are determined as the target current Imt so that the output (the work rate) of the electric motor MTR becomes maximal.

The first intersection point Pxa: a in which the q-axis target current Iqt is positive indicates a maximum output point when the electric motor MTR is driven in the normal rotation direction. For example, when the braking operation member BP is rapidly operated and the electric motor MTR is rapidly accelerated from the stop state, the first intersection point Pxa: a is determined as the target current vector Imt: 1. Since the target current vector Imt (Idt, Iqt) is determined as the first intersection point Pxa (Idx, Iqx), the actual pressing force Fpa can be increased most efficiently with high responsiveness.

The second intersection point Pxb: a in which the q-axis target current Iqt is negative indicates a maximum output point when the electric motor MTR is driven in the reverse rotation direction. For example, when the electric motor MTR is rapidly stopped by starting the vehicle wheel slip suppression control while the electric motor MTR is driven in the normal rotation direction, the second intersection point Pxb: a is determined as the target current vector Imt: 4. Since the target current vector Imt (Idt, Iqt) is determined as the second intersection point Pxb (Idx, −Iqx), the actual pressing force Fpa can be decreased most efficiently with high responsiveness.

Meanwhile, when the absolute value of the compensation instruction current Imr is relatively small (for example, case of "Imr=iq2 (<Iqx)" and "Imr=iq5 (>−Iqx)"), the determination processes are negative in steps S290, S320, S590, and S620. Then, in steps S410, S460, S710, and S760, the voltage limiting circle d-axis coordinate Ids is calculated on the basis of the compensation instruction current Imr and the voltage limiting circle Cvs. The limiting circle d-axis coordinate Ids indicates a value (a coordinate) of the d-axis target current Idt when the q-axis target current Iqt is the compensation instruction current Imr in the voltage limiting circle Cvs. Specifically, the compensation instruction current Imr is applied to the q-axis target current Iqt of Equation (2) and the calculated d-axis target current Idt is employed as the limiting circle d-axis coordinate Ids. In steps S420, S470, S720, and S770, "Idt=Ids and Iqt=Imr" are determined. That is, since the q-axis current is limited by the limiting circle d-axis coordinate Ids, the target current Imt is determined as vectors Imt: 2 and Imt: 5. Also in this case, since the d-axis target current Idt is sufficiently secured in the energizable region, the responsiveness of the electric motor MTR can be improved. Additionally, since the d-axis target current Idt is set on the voltage limiting circle Cvs, the electric motor MTR is efficiently driven and hence the generation of heat can be reduced.

A case in which the rotation speed dMk is relatively small is indicated by the voltage limiting circle Cvs: b. In this state, the current limiting circle Cis intersects the voltage limiting circle Cvs: b at the points Pxa: b and Pxb: b in the correlation between the current limiting circle Cis and the voltage limiting circle Cvs: b. In this state, since the first intersection point Pxa: b exists in the first quadrant and the second intersection point Pxb: b exists in the fourth quadrant, the determination processes are positive in steps S280, S310, S580, and S610.

In this state, the determination processes are positive in steps S300 and S600 in the case of "Imr=iq3 (>iqm)" set so that the electric motor MTR is driven in the normal rotation direction. Then, in steps S430 and S730, "Idt=0 and Iqt=iqm" are determined. That is, a vector Imt: 3 (a vector directed from the origin O to the point (0, iqm)) is calculated as the target current vector Imt. Further, the determination processes are positive in steps S330 and S630 in the case of "Imr=iq6 (<−iqm)" set so that the electric motor MTR is driven in the reverse rotation direction. Then, in steps S480 and S780, "Idt=0 and Iqt=−imq" are determined.

When the rotation speed dMk is relatively small, magnetic flux weakening control is not necessary and "Idt=0" is set. The d-axis current and the q-axis current have a trade-off relation. For this reason, since the d-axis target current Idt is set to "0", it is possible to maximally use the q-axis target current Iqt acting in the torque direction during the energization of the electric motor MTR.

A case in which the rotation speed dMk is further low and the electric motor MTR is substantially stopped is indicated by a voltage limiting circle Cvs: c. In this state, the current limiting circle Cis is included in the voltage limiting circle Cvs: c and the intersection point Px does not exist. Thus, the determination processes are positive in steps S280, S310, S580, and S610 as described above. Further, the determination processes are negative in steps S300, S330, S600, and S630. Then, in steps S440, S490, S740, and S790, "Idt=0 and Iqt=Imr" are determined. Also in this case, the magnetic flux weakening control is not necessary and the electric motor MTR is driven only on the basis of the necessary compensation instruction current Imr (that is, the request torque).

Further, when the rotation speed dMk is relatively small, a point (0, iqm) and (0, −iqm) located on the boundary of the energizable region becomes a maximum output point. For this reason, when the absolute value of the compensation instruction current Imr is instructed to exceed the q-axis maximum current value iqm, the absolute value of the compensation instruction current Imr is limited by the q-axis maximum current value (the current rated value) iqm. Meanwhile, when the absolute value of the compensation instruction current Imr is smaller than the q-axis maximum current value iqm, the limiting of the compensation instruction current Imr is not performed and the compensation instruction current Imr is directly set as the q-axis element of the target current vector Imt.

<Second Process Example of Target Current Calculation Block IMT>

Figure 7:
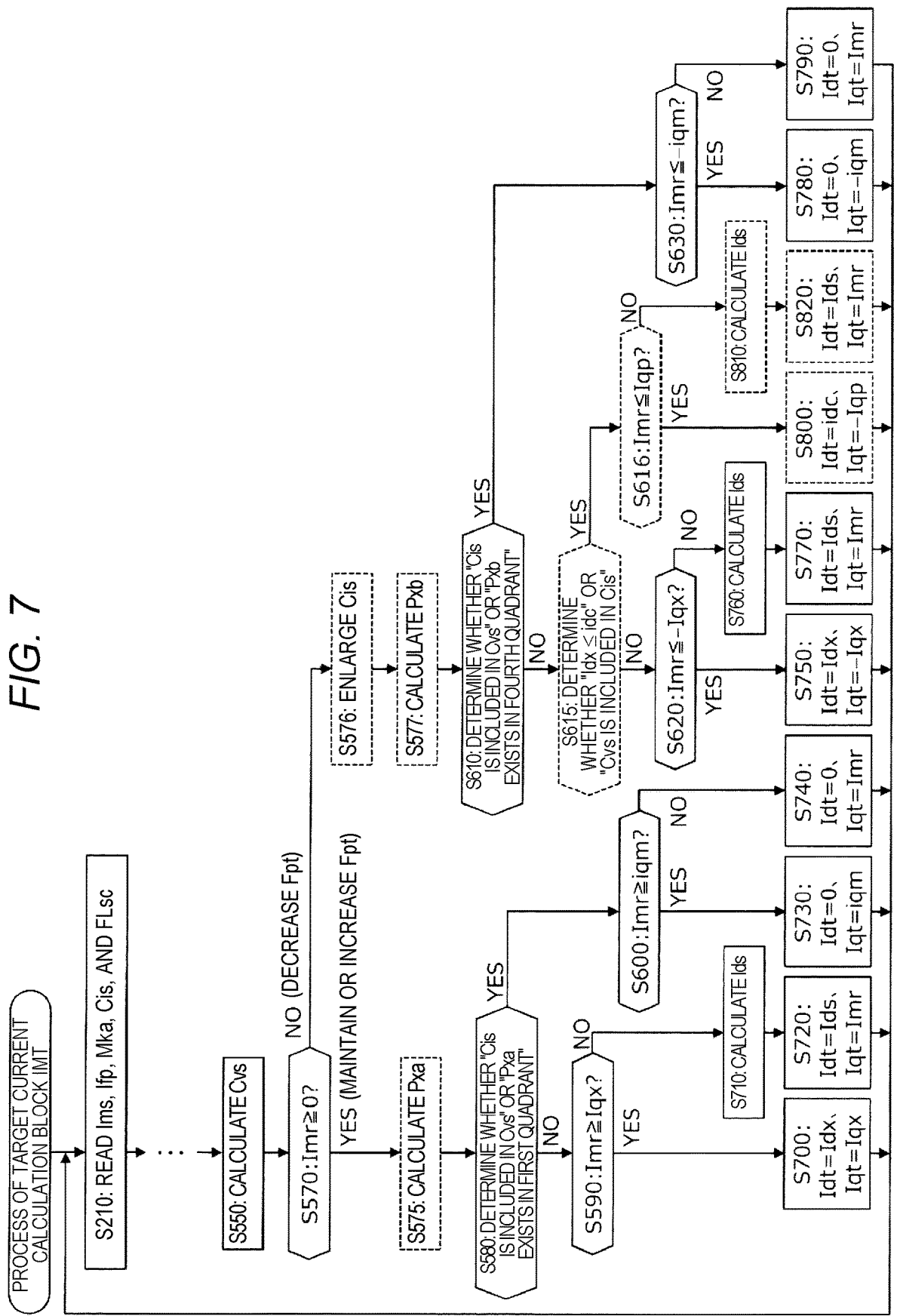
FIG. 7 is a flowchart for describing a second process example of the target current calculation block IMT.
Figure 8:
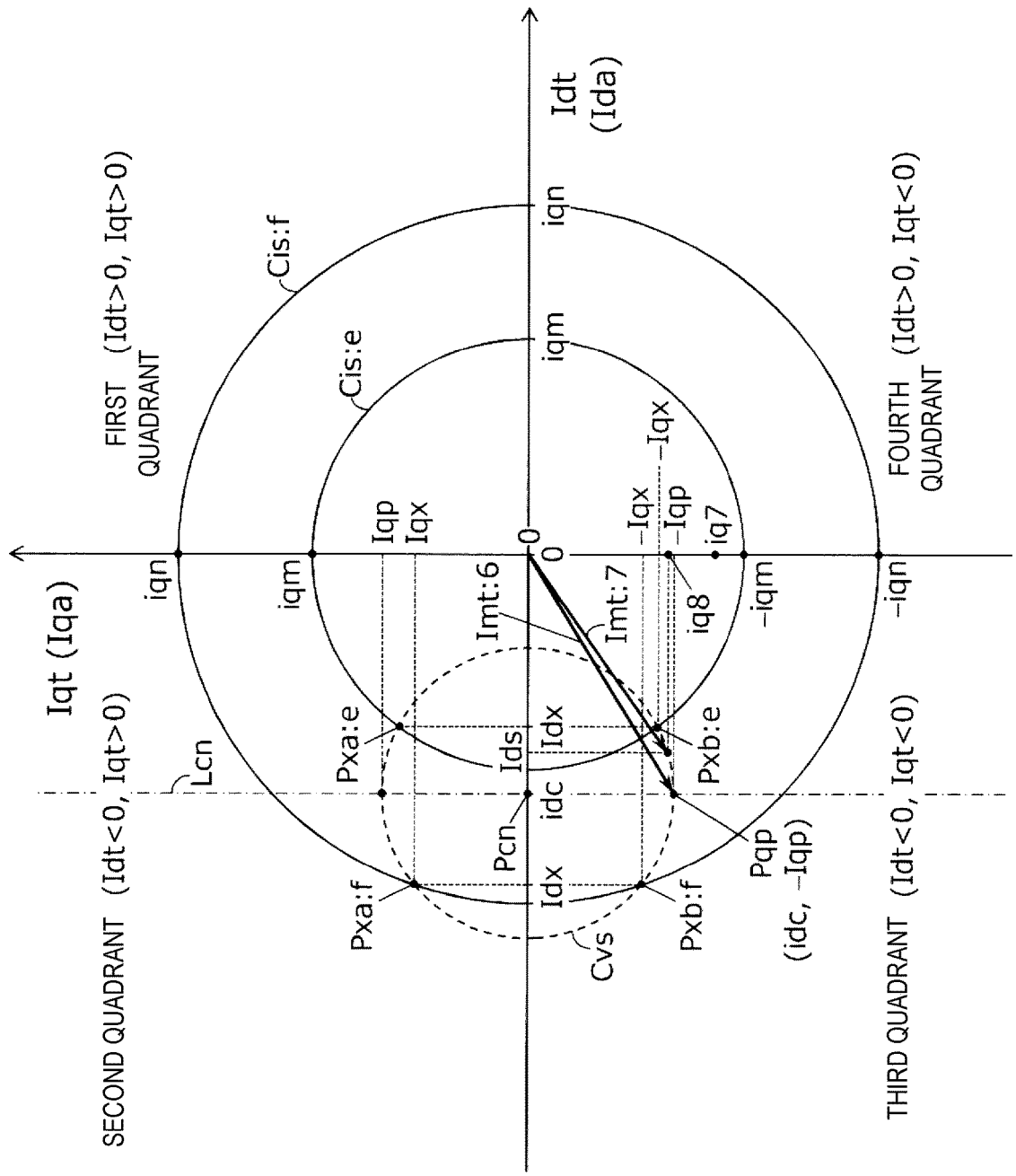
FIG. 8 is a characteristic diagram for describing the second process example of the target current calculation block IMT.
Figure 9:
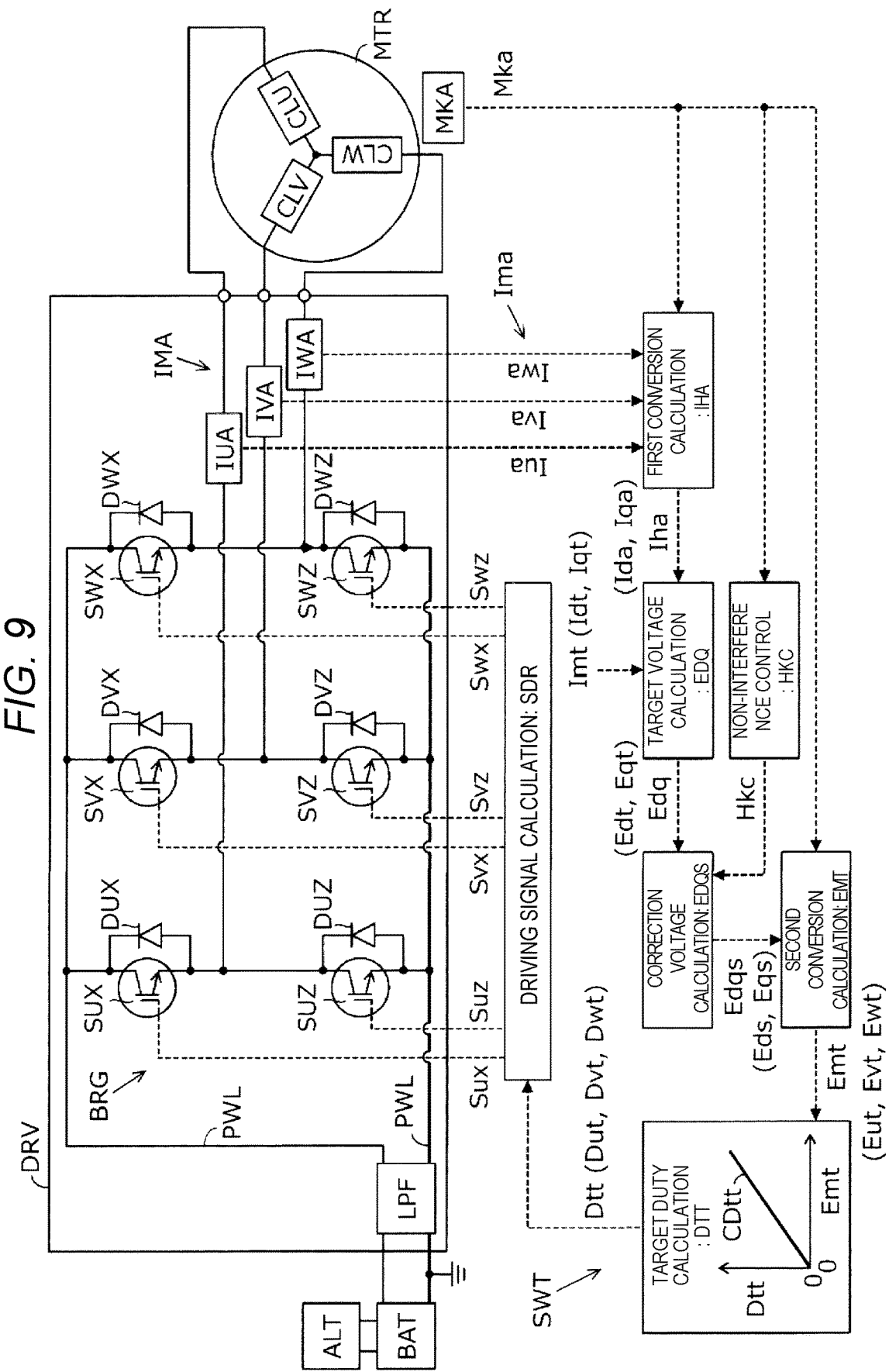
FIG. 9 is a schematic diagram for describing a process of a switching control block SWT and a driving circuit DRV of a three-phase brushless motor.

A second process example of the target current calculation block IMT will be described with reference to the flowchart of FIG. 7 and the characteristic diagram of FIG. 8. In the second process example, the current limiting circle Cis is enlarged for a predetermined time tkz from a time point in which the vehicle wheel slip suppression control starts and hence the responsiveness of the operation of stopping and reversing the electric motor MTR is further improved.

<<Flow of Process>>

First, a flow of a process (particularly, when the vehicle wheel slip suppression control is executed) will be described with reference to the flowchart of FIG. 7. Here, since a process step indicated by the same symbol as that of the first process example is the same as that of the first process example, a description thereof will be omitted. In the second process example, a process block (S576 or the like) indicated by a dashed line is added or changed with respect to the first process example (see FIG. 5).

In the first process example, the first and second intersection points Pxa and Pxb are calculated regardless of the rotation direction of the electric motor MTR in step S560. However, in the second process example, when the electric motor MTR rotates in the normal rotation direction, the first intersection point Pxa is calculated in step S575. Meanwhile, when the electric motor MTR rotates in the reverse rotation direction, the second intersection point Pxb is calculated in step S576. This is because the current limiting circle Cis is enlarged in order to stop and reverse the electric motor MTR at the initial stage of the vehicle wheel slip suppression control. Hereinafter, these processes will be described in detail.

When the process is negative in step S570, the process proceeds to step S576. In step S576, the current limiting circle Cis is enlarged. Specifically, the radius of the current limiting circle Cis is changed to the value iqn larger than the q-axis maximum current value iqm. The q-axis maximum current value iqm is the allowable current value of each of the switching elements SUX to SWZ, but the switching elements SUX to SWZ are energized at a value exceeding the allowable current value iqm only for a short time. Here, the value iqn is a predetermined value and is referred to as the "enlarged allowable current value".

In step S577, the second intersection point Pxb (Idx, −Iqx) is calculated on the basis of the enlarged current limiting circle Cis and the voltage limiting circle Cvs. In step S610, it is determined whether the "current limiting circle Cis is included in the voltage limiting circle Cvs or not" or the "second intersection point Pxb (Idx, −Iqx) exists in the fourth quadrant (the d-axis current indicates a region of a positive sign and the q-axis current indicates a region of a negative sign) of the dq-axis current plane or not" on the basis of the enlarged current limiting circle Cis and the second intersection point Pxb (Idx, −Iqx). When the determination is positive in step S610 (case of "YES"), the process proceeds to step S630. After step S630, the same process as that of the first process example is executed.

Meanwhile, when the determination is negative in step S610 (case of "NO"), the process proceeds to step S615. In step S615, it is determined whether the "intersection point d-axis coordinate Idx is equal to or smaller than a value idc or not" or the "voltage limiting circle Cvs is included in the current limiting circle Cis or not" on the basis of the second intersection point Pxb (Idx, −Iqx) or the like. Here, the value idc indicates the d-axis coordinate of the center of the voltage limiting circle Cvs. When the determination is negative in step S615 (case of "NO"), the process proceeds to step S620. After step S620, the same process as that of the first process example is executed.

When the determination is positive in step S615 (case of "YES"), the process proceeds to step S616. In step S616, it is determined whether the "compensation instruction current Imr is equal to or smaller than the vertex q-axis coordinate Iqp or not" on the basis of the compensation instruction current Imr, and the vertex q-axis coordinate Iqp. Here, the vertex q-axis coordinate Iqp indicates a q-axis coordinate (a variable) of a point (a vertex Pqp (idc, −Ipq)) in which the absolute value of the q-axis coordinate becomes maximal in the overlapping portion of the current limiting circle Cis and the voltage limiting circle Cvs. When the determination is positive in step S616 (case of "YES"), the process proceeds to step S800. Meanwhile, when the determination is negative in step S616 (case of "NO"), the process proceeds to step S810.

In step S800, the d-axis target current Idt is determined as idc and the q-axis target current Iqt is determined as the vertex q-axis coordinate-Iqp (the variable) (that is, "Idt=idc, Iqt=−Iqp"). In step S810, the voltage limiting circle d-axis coordinate Ids (the variable) is calculated on the basis of the compensation instruction current Imr and the voltage limiting circle Cvs. Then, in step S820, the d-axis target current Idt is determined as the voltage limiting circle d-axis coordinate Ids and the q-axis target current Iqt is determined as the compensation instruction current Imr (that is, "Idt=Ids, Iqt=Imr").

<<Target Current Vector Imt (Idt, Iqt) of Correlation Between Current Limiting Circle Cis and Voltage Limiting Circle Cvs>>

Next, a characteristic of a second process example will be described with reference to the characteristic diagram of FIG. 8. In the second process example, the current limiting circle Cis is enlarged to exceed the allowable current value iqm only for a short time immediately after the execution of the vehicle wheel slip suppression control starts.

When the vehicle wheel slip suppression control is not executed, a current limiting circle Cis: e is determined on the basis of the allowable current value iqm. In step S576, a current limiting circle Cis: f is determined on the basis of the enlarged allowable current value iqn (>iqm) until the predetermined time tkz elapses from the vehicle wheel slip suppression control start time point. Specifically, the current limiting circle Cis: f is determined by replacing the value iqm of Equation (1) with the enlarged allowable current value iqn. Here, the enlarged allowable current value iqn is a predetermined value.

Since the current limiting circle Cis is enlarged from the current limiting circle Cis: e to the current limiting circle Cis: f, two intersection points Px change. Specifically, the first and second intersection points Pxa: e and Pxb: e change to the first and second intersection points Pxa: f and Pxb: f. That is, the first and second intersection points Pxa and Pxb move farther away from the q axis. Since the enlargement of the current limiting circle Cis corresponds to the stopping and the reversing of the electric motor MTR, the second intersection point Pxb: f is considered at the time of determining the target current vector Imt (Idt, Iqt). When the determination is negative in step S610, the process proceeds to step S615.

By the determination on whether the "intersection point d-axis coordinate Idx is equal to or smaller than the value idc or not" in step S615, it is determined whether the second intersection point Pxb is farther from or closer to the q axis with respect to the "line Lcn passing through the center Pcn (idc, 0) and parallel to the q axis". When "Idx<idc" and the second intersection point Pxb is farther from the q axis with respect to the line Lcn as indicated by the second intersection point Pxb: f, the process proceeds to step S616.

In step S616, it is determined whether the "compensation instruction current Imr is equal to or larger than the vertex q-axis coordinate Iqp or not". Here, the vertex q-axis coordinate Iqp is the q-axis coordinate of the vertex Pqp (idc, −Ipq) in which the absolute value of the q-axis coordinate becomes maximal in a portion in which the current limiting circle Cis overlaps the voltage limiting circle Cvs.

Specifically, the vertex Pqp is an intersection point between the line Lcn ("Idt=idc") and the voltage limiting circle Cvs.

When the compensation instruction current Imr (a negative value) is relatively small and "Imr Iqp" is satisfied, "Idt=idc and Iqt=−Iqp" are calculated in step S800. For example, a target current vector Imt: 6 (a vector directed from the origin O to the vertex Pqp) is determined in the case of "Imr=iq7". The vertex Pqp is an operation point in which the electric motor MTR is most efficiently driven. For this reason, it is possible to more appropriately stop and reverse the electric motor MTR and to suppress the generation of heat as compared with a case in which the target current vector Imt is determined by the second intersection point Pxb: f.

When the compensation instruction current Imr (a negative value) is relatively small and "Imr Iqp" is not satisfied, the limiting circle d-axis coordinate Ids is calculated in step S810. Similarly to the first process example, the limiting circle d-axis coordinate Ids indicates a value of the d-axis target current Idt when the q-axis target current Iqt of the voltage limiting circle Cvs is the compensation instruction current Imr. Specifically, the limiting circle d-axis coordinate Ids is calculated by applying the compensation instruction current Imr to the q-axis target current Iqt of Equation (2). Then, "Idt=Ids and Iqt=Imr" are calculated in step S820. For example, the target current vector Imt: 7 is determined in the case of "Imr=iq8". Since the d-axis target current Idt is sufficiently secured in the energizable region, the responsiveness of stopping and reversing the electric motor MTR is improved and hence the generation of heat can be reduced.

In the second process example, the current limiting circle Cis is enlarged to the enlarged allowable current value iqn to exceed the allowable current value iqm, but the continuation time is limited to a short time (within the predetermined time tkz). That is, the current limiting circle is returned to the current limiting circle Cis calculated by using the allowable current value imq (the enlargement of the current limiting circle Cis is stopped) after the predetermined time tkz elapses from the vehicle wheel slip suppression control start time point. Thus, the temperature rise of the electric motor MTR and the driving circuit DRV is slight.

Further, the enlargement of the current limiting circle Cis can be ended (stopped) on the basis of the rotation speed dMk. For example, the enlargement of the current limiting circle Cis is continued when the rotation speed dMk is still equal to or higher than a predetermined speed dmz (a positive sign) and is ended when the rotation speed dMk is lower than the predetermined speed dmz. That is, the enlargement of the current limiting circle Cis is ended at a time point in which the rotation speed dMk of the electric motor MTR changes from a state in which the rotation speed is equal to or higher than the predetermined speed dmz to a state in which the rotation speed is lower than the predetermined speed dmz and is returned to the original current limiting circle Cis. Since the enlargement of the current limiting circle Cis is limited for a shorter time, an increase in temperature of the electric motor MTR and the driving circuit DRV can be suppressed.

The improvement of the responsiveness of stopping and reversing the electric motor MTR immediately after the start of the vehicle wheel slip suppression control is particularly necessary when the rotation speed dMk is very high before the start of the control. Thus, the enlargement of the current limiting circle Cis is allowed when the rotation speed dMk is equal to or higher than a predetermined speed dmx (a positive sign) at the vehicle wheel slip suppression control start time point and the enlargement of the current limiting circle Cis is prohibited when the rotation speed dMk is lower than the predetermined speed dmx at that time point. Since the current limiting circle Cis is enlarged only at the necessary minimum limit in response to the rotation speed dMk of the electric motor MTR, an increase in temperature of the electric motor MTR and the driving circuit DRV can be more reliably suppressed.

<Process of Switching Control Block SWT and Driving Circuit DRV of Three-Phase Brushless Motor>

Referring to the schematic diagram of FIG. 7, a process of the switching control block SWT and the driving circuit DRV of the three-phase brushless motor will be described. The three-phase brushless motor MTR includes three coils (windings) of a U-phase coil CLU, a V-phase coil CLV, and a W-phase coil CLW. The electric motor MTR is provided with the rotation angle sensor MKA which detects the rotation angle (the rotor position) Mka of the electric motor MTR. The rotation angle Mka is input to the switching control block SWT of the controller ECU.

<<Process of Switching Control Block SWT>>

First, a process of the switching control block SWT will be described. In the switching control block SWT, the driving signals Sux, Suz, Svx, Svz, Swx, and Swz (that is, Sux to Swz) of the switching elements SUX, SUZ, SVX, SVZ, SWX, and SWZ (that is, SUX to SWZ) of the three-phase bridge circuit BRG are determined on the basis of the target current Imt, the actual current value (the detection value) Ima, and the rotation angle Mka (the detection value) of the electric motor MTR.

In the switching control block SWT, a duty ratio (a ratio of ON time to one cycle) of the pulse width is determined on the basis of the magnitude of the target current Imt and a predetermined characteristic (a calculation map). At the same time, the rotation direction of the electric motor MTR is determined on the basis of the sign (the positive or negative sign) of the target current Imt. For example, the rotation direction of the electric motor MTR is set such that the normal rotation direction is a positive (plus) value and the reverse rotation direction is a negative (minus) value. Since a final output voltage is determined by the input voltage (the voltage of the storage battery BAT) and the duty ratio Dtt, the rotation direction and the output torque of the electric motor MTR are determined. Specifically, since the energization time per unit time increases in the switching element as the duty ratio Dtt increases, a larger current flows to the electric motor MTR and hence the output (the rotational power) becomes larger.

The switching control block SWT includes a first conversion calculation block IHA, a target voltage calculation block EDQ, a non-interference control block HKC, a correction voltage calculation block EDQS, a second conversion calculation block EMT, a target duty calculation block DTT, and a driving signal calculation block SDR. The electric motor MTR is driven by so-called vector control.

In the first conversion calculation block IHA, a converted actual current Iha is calculated on the basis of the actual current Ima and the rotation angle Mka. The converted actual current Iha is obtained by the conversion of the actual current Ima from three phases to two phases and from a fixed coordinate to a rotation coordinate. The converted actual current Iha is a vector in the dq axes (a rotor fixed coordinate) and is obtained by the d-axis element (also referred to as a "d-axis actual current") Ida and the q-axis element (also referred to as a "q-axis actual current") Iqa.

In the first conversion calculation block IHA, the actual current Ima is converted from three phases to two phases. The actual current Ima is a generic name of respective phases (U, V, and W phases) of the bridge circuit BRG and includes, specifically, a U-phase actual current Iua, a V-phase actual current Iva, and a W-phase actual current Iwa. In order to handle three signals at the same time, a calculation in a three-dimensional space is necessary. In order to facilitate the calculation, the three-phase actual current Ima (Iua, Iva, Iwa) is converted into a two-phase actual current Ina (Iα, Iβ) (so-called Clarke transformation) by using a fact that "Iua+Iva+Iwa=0" is established in the ideal three-phase alternating current.

The three-phase actual currents (the detection values) Iua, Iva, and Iwa are converted into two-phase actual currents Iα and Iβ by Clarke transformation. That is, the actual currents Iua, Iva, and Iwa of the symmetrical three-phase alternating current (three-phase alternating current with phases shifted by 120°) are converted into the actual currents Iα and Iβ of the two-phase alternating current.

Further, in the first conversion calculation block IHA, the converted actual current Iha is calculated by performing a coordinate conversion from a fixed coordinate (a stationary coordinate) to a rotation coordinate on the basis of the rotation angle Mka. The converted actual current Iha is formed by the d-axis element (the d-axis actual current) Ida and the q-axis element (the q-axis actual current) Iqa. That is, since the current value Ina subjected to the Clarke transformation corresponds to a current flowing to the rotor, the coordinate is converted to the rotor fixed coordinate (which is a rotation coordinate and is a dq-axis coordinate) (so-called park transformation). On the basis of the rotor rotation angle Mka from the rotation angle sensor MKA, the fixed coordinate is converted into the rotation coordinate (dq-axis coordinate) and the actual current Iha (Ida, Iqa) after the conversion of the coordinate is determined.

In the target voltage calculation block EDQ, a target voltage vector Edq is calculated on the basis of the target current vector Imt (Idt, Iqt) and the actual current Iha (Ida, Iqa) subjected to park transformation. In the vector control, so-called current feedback control is executed so that the "dq-axis elements Idt and Iqt of the target current" match the "dq-axis elements Ida and Iqa of the actual current". Thus, in the target voltage calculation block EDQ, PI control is executed on the basis of the deviation (the current deviation) between the "dq-axis target currents Idt and Iqt" and "dq-axis actual currents Ida and Iqa". In the PI control, P control (which is proportional control in response to the deviation between the target value and the actual value) and I control (which is integral control in response to the integral value of the deviation) are performed in parallel.

Specifically, in the target voltage calculation block EDQ, the target voltage Edq is determined so that the current deviation between the target current Imt and the converted actual current decreases (that is, the deviation approaches "0") on the basis of the deviation with respect to Iha. The target voltage Edq is a vector for the dq axes and includes ad-axis element (also referred to as a "d-axis target voltage") Edt and a q-axis element (also referred to as a "q-axis target voltage") Eqt.

In the non-interference control block HKC, an interference element for correcting the target voltages Edt and Eqt is calculated. This is because not only the d-axis current but also the q-axis current change (which are called "interference element") when the d-axis voltage increases. The interference element also exists in the q-axis current. Additionally, in the non-interference control block HKC, the counter electromotive force is also considered. This is because the counter electromotive force for decreasing the amount of a current is generated when the electric motor MTR rotates.

Specifically, in the non-interference control block HKC, the q-axis current interference compensation element is calculates as "−ω·Igt·L" on the basis of the electrical angular velocity ω, the q-axis target current Iqt, and the coil/inductance L. Similarly, the d-axis current interference compensation element is calculated as "ω·Idt·L". Further, the counter electromotive force compensation element is calculated as "ω·φ" on the basis of the electrical angular velocity ω and the field magnetic flux φ of the magnet. Then, each calculation result is input to the correction voltage calculation block EDQS as the compensation value Hkc.

In the correction voltage calculation block EDQS, a correction voltage vector Edqs (Eds, Eqs) is calculated on the basis of the target voltage vector Edq (Edt, Eqt) and the compensation value Hkc. Here, the correction voltage vector Edqs (Eds, Eqs) is a target vector of a final voltage and is obtained by correcting the target voltage vector Edq using the compensation value Hkc. Specifically, the d-axis element Eds and the q-axis element Eqs of the correction voltage Edqs are calculated by Equations (3) and (4) below.

$$Eds=Edt-\omega \cdot Iqt \cdot L \quad \text{Equation (3)}$$

$$Eqs=Eqt+\omega \cdot Idt \cdot L+\omega \cdot \phi \quad \text{Equation (4)}$$

Furthermore, a second term of Equation (3) is a compensation term of the q-axis current interference. Further, a second term of Equation (4) is a compensation term of the d-axis current interference and a third term thereof is a compensation term of the counter electromotive force.

In the second conversion calculation block EMT, the final target voltage Emt is calculated on the basis of the correction voltage vector Edqs and the rotation angle Mka. The target voltage Emt is a generic name of respective phases of the bridge circuit BRG and includes a U-phase target voltage Eut, a V-phase target voltage Evt, and a W-phase target voltage Ewt.

First, in the second conversion calculation block EMT, the correction voltage vector Edqs is reversely converted from the rotation coordinate to the fixed coordinate on the basis of the rotation angle Mka so that the two-phase target voltages Eα and Eβ are calculated (so-called inverse park transformation). Then, the two-phase target voltages Eα and Eβ are reversely converted to the three-phase target voltages Emt (the target voltage values Eut, Evt, and Ewt of respective phases) by the space vector transformation.

In the target duty calculation block DTT, a duty ratio (a target value) Dtt of each phase is calculated on the basis of the target voltage Emt of each phase. The duty ratio Dtt is a generic name of respective phases and includes a U-phase duty ratio Dut, a V-phase duty ratio Dvt, and a W-phase duty ratio Dwt. Specifically, the duty ratio Dtt is calculated to monotonously increase from "0" as the target voltage value Emt of each phase increases from "0" in accordance with a calculation characteristic CDtt.

In the driving signal calculation block SDR, signals Sux to Swz for driving the switching elements SUX to SWZ constituting respective phases of the bridge circuit BRG are determined on the basis of the duty ratio Dtt. On the basis of the driving signals Sux to Swz, the ON/OFF states of the switching elements SUX to SWZ are switched and the electric motor MTR is driven. As described above, the process of the switching control block SWT has been described.

<<Driving Circuit DRV>>

Next, the driving circuit DRV will be described. The driving circuit DRV includes the three-phase bridge circuit BRG and a stabilizing circuit LPF. The driving circuit DRV is an electric circuit which drives the electric motor MTR and is controlled by the switching control block SWT.

The bridge circuit BRG (also referred to as an inverter circuit) includes six switching elements (power transistors) SUX, SUZ, SVX, SVZ, SWX, and SWZ (SUX to SWZ). On the basis of the driving signals Sux, Suz, Svx, Svz, Swx, and Swz (Sux to Swz) of respective phases from the switching control block SWT inside the driving circuit DRV, the bridge circuit BRG is driven and the output of the electric motor MTR is adjusted.

Six switching elements SUX to SWZ are elements capable of turning on or off apart of the electric circuit. For example, MOS-FETs and IGBTs are employed as the switching elements SUX to SWZ. In the brushless motor MTR, the switching elements SUX to SWZ constituting the bridge circuit BRG are controlled on the basis of the detection value Mka of the rotation angle (the rotor position). Then, the directions (that is, the excitation directions) of the currents of the coils CLU, CLV, and CLW of three phases (U, V, and W phases) are sequentially switched and the electric motor MTR is rotationally driven. That is, the rotation direction (the normal rotation direction or the reverse rotation direction) of the brushless motor MTR is determined by a relationship of an excitation position with respect to the rotor. Here, the normal rotation direction of the electric motor MTR is a rotation direction of the pressing force Fpa using the pressurization unit KAU and the reverse rotation direction of the electric motor MTR is a rotation direction corresponding to a decrease in the pressing force Fpa.

The current sensor IMA (a generic name) which detects the actual current Ima (a generic name of respective phases) between the bridge circuit BRG and the electric motor MTR is provided in three phases (U, V, and W phases). Specifically, the U-phase current sensor IUA for detecting the U-phase actual current Iua, the V-phase current sensor IVA for detecting the V-phase actual current Iva, and the W-phase current sensor IWA for detecting the W-phase actual current Iwa are provided in respective phases. The detected phase currents Iua, Iva, and Iwa are respectively input to the switching control block SWT.

Then, in the switching control block SWT, the above-described current feedback control is executed. On the basis of the deviation eIm between the actual current Ima and the target current Imt, the duty ratio Dtt is corrected (finely adjusted). By the current feedback control, the control is executed so that the actual value Ima matches the target value Imt (that is, the current deviation eIm approaches "0"). As a result, high-precision motor control can be achieved.

The driving circuit DRV receives electric power from the electric power source (the storage battery BAT, the generator ALT). In order to reduce a change in the supplied electric power (the voltage), the driving circuit DRV is provided with the stabilizing circuit LPF. The stabilizing circuit LPF is a so-called LC circuit which is configured by the combination of at least one condenser (capacitor) and at least one inductor (coil). As described above, the driving circuit DRV has been described.

<Operation and Effect>

Referring to the time chart of FIG. 10, the operation and effect of the braking control device BCS for the vehicle according to the invention will be described. A case in which the vehicle wheel slip suppression control (for example, the anti-skid control) is started while the actual pressing force Fpa is increased when a driver suddenly operates the braking operation member BP is supposed. For the high-precision control by the current feedback control, the q-axis target current Iqt overlaps the q-axis actual current Iqa and the d-axis target current Idt overlaps the d-axis actual current Ida in FIG. 10.

At a time point to, a sudden operation of the braking operation member BP is started by a driver so that the braking operation amount Bpa starts to increase from "0". After the time point t1, the braking operation amount Bpa is constantly maintained at a value bp1. In accordance with an increase in the braking operation amount Bpa, the instruction pressing force Fps is calculated as indicated by a one-dotted chain line and the instruction pressing force Fps is directly determined as the target pressing force Fpt (that is, "Fpt=Fps"). That is, the target pressing force Fpt increases from "0" to a value fp1 corresponding to the value bp1. However, since there is a time delay at the time of activating the electric motor MTR (starting the rotation in the normal rotation direction), the actual pressing force Fpa increases from "0" with a gentle inclination as compared with the target pressing force Fpt as indicated by a solid line.

When the electric motor MTR is stopped or is rotated at a low speed, the magnetic flux weakening control is unnecessary. For this reason, immediately after the start of the braking operation (immediately after the time point t1), the d-axis currents Idt and Ida are "0" and only the q-axis currents Iqt and Iqa are generated. Then, when the rotation speed of the electric motor MTR increases, the d-axis target current Idt decreases from "0" toward a value −id2 (the absolute value of the d-axis target current Idt increases). Since the d-axis target current Idt and the q-axis target current Iqt have a trade-off relationship, the q-axis target current Iqt decreases from the q-axis maximum current value iqm.

The vehicle wheel slip state amount Slp increases with an increase in the actual pressing force Fpa. Then, at a time point t2 in which the actual pressing force Fpa reaches a value fp2, an anti-skid control start condition is satisfied and the anti-skid control is started. At the anti-skid control execution start time point t2, the target pressing force Fpt suddenly decreases from the instruction pressing force Fps to the value fp2 of the actual pressing force Fpa at the time point t2. That is, the target pressing force Fpt is calculated such that the instruction pressing force Fps is corrected to decrease on the basis of the actual pressing force Fpa (the value fp2) at the time of starting the slip suppression control (the time point t2). Specifically, the instruction pressing force Fps is corrected to decrease to the "value fp2 of the actual pressing force Fpa at the time of starting the control" and then the final target pressing force Fpt is determined. Then, the target pressing force Fpt after the time point t2 is calculated with reference to the target pressing force Fpt at the time point t2.

Further, the target current vector Imt is determined on the basis of the correlation between the current limiting circle Cis and the voltage limiting circle Cvs so that the motion of the electric motor MTR in the normal rotation direction is suddenly stopped and the motion thereof in the reverse rotation direction is started at the time point t2. Specifically, the target current vector Imt (Idt, Iqt) is determined while being limited by the second intersection point d-axis coordinate Idx and the second intersection point q-axis coordinate Iqx (see step S750 of FIG. 5 and the target current vector Imt: 4 of FIG. 6).

Since the sudden stop of the electric motor MTR is efficiently instructed at the time point t2, the actual pressing force Fpa slightly overshoots from the value fp2 to the value fp3, but then decreases quickly. At the time point t3, the target pressing force Fpt is the same as the actual pressing force Fpa. After the time point t3, the target pressing force Fpt is repeatedly increased or decreased so that the vehicle wheel slip state amount Slp enters an appropriate range. That is, the general anti-skid control is continued.

The final target pressing force Fpt is calculated by correcting the instruction pressing force Fps on the basis of the actual pressing force (the detection value) Fpa at the time of starting the execution of the slip suppression control. For this reason, the deviation eFp between the target pressing force Fpt and the actual pressing force Fpa does not occur at the time of starting the execution of the slip suppression control. As a result, it is possible to appropriately prevent a problem in which a decrease in the actual pressing force Fpa is disturbed due to the interference between the pressing force feedback control and the vehicle wheel slip suppression control. That is, it is possible to suppress an excessive vehicle wheel slip due to a time delay of an increase in the pressing force at the time of starting the execution of the slip suppression control.

Additionally, the target current vector Imt (Idt, Iqt) is determined on the basis of the correlation between the current limiting circle Cis and the voltage limiting circle Cvs at the time of starting the execution of the slip suppression control. Specifically, the second intersection point Pxb (Idx, −Iqx) between the current limiting circle Cis and the voltage limiting circle Cvs is calculated and the second intersection point Pxb is calculated as the target current vector Imt (Idt, Iqt). Here, the second intersection point Pxb (Idx, −Iqx) is one in which the q-axis target current Iqt is instructed in the reverse rotation direction (the q-axis target current Iqt has a negative sign) between two intersection points Pxa and Pxb. An overlapping portion between the current limiting circle Cis and the voltage limiting circle Cvs is an energizable region of the electric motor MTR and the second intersection point Pxb (Idx, −Iqx) is an operation point in which the electric motor MTR is most efficiently driven in the reverse rotation direction. For this reason, the electric motor MTR moving in the normal rotation direction is immediately stopped and is driven in the reverse rotation direction. As a result, the vehicle wheel slip suppression control can be executed so that the excessive vehicle wheel slip is suppressed and the slip state amount Slp enters an appropriate range.

Further, the current limiting circle Cis can be enlarged only for a short time immediately after the start of the vehicle wheel slip suppression control. For example, as indicated by a dashed line, the q-axis target current Iqt decreases from "0" to an enlarged current allowable value −iqn (<−iqm) at the time point t2. The electric motor MTR is stopped and is driven in the reverse rotation direction with higher responsiveness as the current limiting circle Cis is enlarged. As a result, since the overshoot of the actual pressing force Fpa is suppressed, the occurrence of the excessive vehicle wheel slip can be appropriately suppressed.

OTHER EMBODIMENTS

Hereinafter, other embodiments will be described. Also in other embodiments, the same effect as described above (the prompt stop of the electric motor MTR in the rotation state and the suppression of the excessive vehicle wheel slip) is obtained.

In the above-described embodiment, the case of calculating the voltage limiting circle Cvs by using Equation (2) has been exemplified. In the calculation of the voltage limiting circle Cvs, a voltage drop due to the flow of the current to the electric motor MTR can be considered. The voltage drop is considered as "$(R \cdot Iqa)/(L \cdot \omega)$" in the d-axis current and is calculated as "$(R \cdot Ida)/(L \cdot \omega)$" in the q-axis current. Specifically, the voltage limiting circle Cvs is calculated in Equation (5).

$$\{Idt+(\phi/L)+(R \cdot Iqa)/(L \cdot \omega)\}^2+\{(R \cdot Ida)/(L \cdot \omega)-Iqt\}^2=\{Eba/(L \cdot \omega)\}^2 \quad \text{Equation (5)}$$

Here, "Eba" indicates the power supply voltage (that is, the voltages of the storage battery BAT and the generator ALT), "L" indicates the phase inductance, "$\phi$" indicates the number of flux linkage (magnet strength), and "$\omega$" indicates the wiring/winding resistance. Further, "$\omega$" indicates the electrical angular velocity of the electric motor MTR and is calculated on the basis of the rotation angle Mka. Moreover, "Ida" indicates the d-axis actual current, "Iqa" indicates the q-axis actual current, and these currents are calculated on the basis of the detection value Ima of the current sensor IMA (see FIG. 7).

In Equation (3), the voltage drop is considered on the basis of dq-axis actual currents Ida and Iqa. Instead of the dq-axis actual currents Ida and Iqa, the dq-axis target currents Idt [n−1] and Iqt [n−1] of the previous calculation period are employed. That is, the dq-axis target currents Idt [n] and Iqt [n] of the current calculation period can be calculated by considering the voltage drop on the basis of the dq-axis target currents Idt [n−1] and Iqt [n−1] of the previous calculation period. Here, the symbol [n] at the end of the symbol indicates the current calculation period and the symbol [n−1] indicates the previous calculation period. Specifically, in Equation (6), the voltage limiting circle Cvs is calculated.

$$\{Idt[n]+(\phi/L)+(R \cdot Igt[n-1])/(L \cdot \omega)\}^2+\{(R \cdot Idt[n-1])/(L \cdot \omega)-Iqt[n]\}^2=\{Eba/(L \cdot \omega)\}^2 \quad \text{Equation (6)}$$

As shown in Equation (5) or Equation (6), the driving of the electric motor MTR can be achieved with higher precision by considering the voltage drop.

In the above-described embodiment, the electrical angular velocity ω is calculated by calculating the electrical angle θ on the basis of the rotation angle Mka (the mechanical angle) of the electric motor MTR and differentiating the electrical angle θ with respect to time in the calculation of the electrical angular velocity ω of the electric motor MTR. That is, the electrical angular velocity ω is determined in order of "Mka→θ→ω". Instead, the rotation speed dMk can be calculated on the basis of the rotation angle Mka and the electrical angular velocity ω can be calculated on the basis of the rotation speed dMk. That is, the electrical angular velocity ω can be determined in order of "Mka→dMk→ω". However, in any case, the voltage limiting circle Cvs of the dq-axis current characteristics is calculated on the basis of the rotation angle Mka detected by the rotation angle sensor MKA.

In the above-described embodiment, a configuration of the disk type braking device (the disk brake) has been exemplified. In this case, the friction member MS is a brake pad and the rotation member KT is a brake disk. Instead of the disk type braking device, a drum type braking device (a drum brake) can be employed. In the case of the drum brake, a brake drum is employed instead of the caliper CP. Further, the friction member MS is a brake shoe and the rotation member KT is a brake drum.

In the above-described embodiment, a case in which a braking force is applied to one vehicle wheel WH by the pressurization unit KAU has been exemplified. However, a braking force can be generated in a plurality of vehicle wheels WH by the pressurization unit KAU. In this case, the plurality of wheel cylinders WC are connected to the fluid path HWC.

Further, as the pressurization cylinder KCL, one having two fluid pressure chambers defined by two pressurization pistons can be employed. That is, the pressurization cylinder KCL employs a tandem type configuration. Then, two wheel cylinders WC of four vehicle wheels WH are connected to one fluid pressure chamber and the other two wheel cylinders WC of four vehicle wheels WH are connected to the other fluid pressure chamber. Accordingly, a so-called longitudinal type or diagonal type fluid configuration in which the pressure cylinder KCL is used as a fluid pressure source can be formed.

In the above-described embodiment, a configuration of the fluid pressure type braking control device in which the rotational power of the electric motor MTR is converted into the fluid pressure of the wheel cylinder WC through a braking fluid and a braking force is generated in the vehicle wheel WH has been exemplified. Instead, an electric/mechanical braking control device which does not use the braking fluid can be employed. In this case, the KAU is mounted on the caliper CP. Further, as the pressing force sensor FPA, a thrust sensor is employed instead of the fluid pressure sensor. For example, the thrust sensor can be provided between the power transmission mechanism DDK and the pressurization piston PKC as indicated by "(FPA)" of FIG. 1.

Further, a composite type configuration in which a fluid pressure type pressurization unit using a braking fluid is employed for a front wheel and an electric/mechanic pressurization unit is employed for a rear wheel can be formed.

The invention claimed is:

1. A braking control device for a vehicle that drives an electric motor on the basis of a target pressing force corresponding to a request braking force for a vehicle wheel of a vehicle and generates a braking force in the vehicle wheel by pressing a friction member against a rotation member fixed to the vehicle wheel, comprising:
  a driving circuit which drives the electric motor;
  a controller which controls the driving circuit on the basis of the target pressing force;
  a rotation angle sensor which detects a rotation angle of the electric motor; and
  a current sensor which detects an actual current of the electric motor,
  wherein the controller sets a current limiting circle in a current characteristic of a d-axis current and a q-axis current of the electric motor on the basis of a specification of the driving circuit, and
  in a case where the current limiting circle is included in a voltage limiting circle in the current characteristic, the voltage limiting circle being calculated on the basis of the rotation angle, the controller calculates an intersection point between a q-axis of the current characteristic and the current limiting circle and calculates a d-axis target current and a q-axis target current on the basis of the intersection point, calculates a d-axis actual current and a q-axis actual current on the basis of the actual current, and controls the driving circuit so that the d-axis actual current and the q-axis actual current match the d-axis target current and the q-axis target current.

2. The braking control device for the vehicle according to claim 1,
  wherein the controller calculates the d-axis actual current and the q-axis actual current on the basis of the actual current and the rotation angle, calculates a counter electromotive force of the electric motor on the basis of the rotation angle, calculates a target voltage on the basis of a deviation between the d-axis target current and the d-axis actual current, a deviation between the q-axis target current and the q-axis actual current, and the counter electromotive force, and controls the driving circuit on the basis of the target voltage.

3. A braking control device for a vehicle that drives an electric motor on the basis of a target pressing force corresponding to a request braking force for a vehicle wheel of a vehicle and generates a braking force in the vehicle wheel by pressing a friction member against a rotation member fixed to the vehicle wheel, comprising:
- a driving circuit which drives the electric motor;
- a controller which controls the driving circuit on the basis of the target pressing force;
- a rotation angle sensor which detects a rotation angle of the electric motor; and
- a vehicle wheel speed sensor which detects a speed of the vehicle wheel,
- wherein the controller sets a current limiting circle in a current characteristic of a d-axis current and a q-axis current of the electric motor on the basis of a specification of the driving circuit, and calculates a voltage limiting circle in the current characteristic on the basis of the rotation angle,
- wherein a slip state amount indicating a slip degree of the vehicle wheel is calculated on the basis of the speed of the vehicle wheel and slip suppression control of decreasing the slip degree of the vehicle wheel is executed on the basis of the slip state amount, and
- wherein the controller calculates a d-axis target current and a q-axis target current on the basis of a correlation between the current limiting circle and the voltage limiting circle at the time of starting the execution of the slip suppression control, and controls the driving circuit on the basis of the d-axis target current and the q-axis target current.

4. The braking control device for the vehicle according to claim 3, wherein the controller calculates an intersection point between the voltage limiting circle and the current limiting circle in the correlation and calculates the d-axis target current on the basis of the intersection point.

5. The braking control device for the vehicle according to claim 4, further comprising:
- a current sensor which detects an actual current of the electric motor,
- wherein the controller calculates a d-axis actual current and a q-axis actual current on the basis of the actual current value and the rotation angle, calculates a counter electromotive force of the electric motor on the basis of the rotation angle, calculates a target voltage on the basis of a deviation between the d-axis target current and the d-axis actual current, a deviation between the q-axis target current and the q-axis actual current, and the counter electromotive force, and controls the driving circuit on the basis of the target voltage.

6. The braking control device for the vehicle according to claim 3, further comprising:
- a current sensor which detects an actual current of the electric motor,
- wherein the controller calculates a d-axis actual current and a q-axis actual current on the basis of the actual current and the rotation angle, calculates a counter electromotive force of the electric motor on the basis of the rotation angle, calculates a target voltage on the basis of a deviation between the d-axis target current and the d-axis actual current, a deviation between the q-axis target current and the q-axis actual current, and the counter electromotive force, and controls the driving circuit on the basis of the target voltage.

7. The braking control device for the vehicle according to claim 3, wherein the controller controls the driving circuit on the basis of the correlation between the current limiting circle and the voltage limiting circle even in a non-execution state in which the slip suppression control is not executed, and, in an execution start state in which the slip suppression control is started, controls the driving circuit on the basis of a current limiting circle that is enlarged relative to the current limiting circle in the non-execution state.

8. A braking control device for a vehicle that drives an electric motor on the basis of a target pressing force corresponding to a request braking force for a vehicle wheel of a vehicle and generates a braking force in the vehicle wheel by pressing a friction member against a rotation member fixed to the vehicle wheel, comprising:
- a driving circuit which drives the electric motor;
- a controller which controls the driving circuit on the basis of the target pressing force;
- a rotation angle sensor which detects a rotation angle of the electric motor; and
- a current sensor which detects an actual current of the electric motor,
- wherein the controller sets a current limiting circle in a current characteristic of a d-axis current and a q-axis current of the electric motor on the basis of a specification of the driving circuit, and
- in a case where a voltage limiting circle is included in the current limiting circle in the current characteristic, the voltage limiting circle being calculated on the basis of the rotation angle, the controller calculates an intersection point between a straight line that passes through the center of the voltage limiting circle and is parallel to a q-axis of the current characteristic and the voltage limiting circle and calculates a d-axis target current and a q-axis target current on the basis of the intersection point, calculates a d-axis actual current and a q-axis actual current on the basis of the actual current, and controls the driving circuit so that the d-axis actual current and the q-axis actual current match the d-axis target current and the q-axis target current.

9. The braking control device for the vehicle according to claim 8,
- wherein the controller calculates the d-axis actual current and the q-axis actual current on the basis of the actual current and the rotation angle, calculates a counter electromotive force of the electric motor on the basis of the rotation angle, calculates a target voltage on the basis of a deviation between the d-axis target current and the d-axis actual current, a deviation between the q-axis target current and the q-axis actual current, and the counter electromotive force, and controls the driving circuit on the basis of the target voltage.

* * * * *